United States Patent [19]

Okazaki et al.

[11] Patent Number: 5,955,206
[45] Date of Patent: Sep. 21, 1999

[54] POLYSULFIDE-BASED RESIN COMPOSITION, POLYSULFIDE-BASED RESIN, AND OPTICAL MATERIAL COMPRISING THE RESIN

[75] Inventors: Koju Okazaki; Chitoshi Shimakawa; Mamoru Tanaka; Yoshinobu Kanemura; Teruyuki Nagata, all of Fukuoka; Yoshihiro Irizato, Kanagawa; Shinichi Umeda, Fukuoka, all of Japan

[73] Assignee: Mitsui Chemicals, Inc., Tokyo, Japan

[21] Appl. No.: 08/640,442

[22] Filed: Apr. 30, 1996

[30] Foreign Application Priority Data

| May 12, 1995 | [JP] | Japan | 7-114418 |
| May 12, 1995 | [JP] | Japan | 7-114419 |
| Jun. 30, 1995 | [JP] | Japan | 7-165285 |
| Aug. 14, 1995 | [JP] | Japan | 7-206914 |

[51] Int. Cl.$^6$ .................................................... B29B 1/02
[52] U.S. Cl. .......................... 428/542.8; 528/60; 528/66; 528/109; 528/376
[58] Field of Search ........................ 528/109, 376, 528/60, 65, 66; 428/542.8; 351/159

[56] References Cited

U.S. PATENT DOCUMENTS

| 5,130,200 | 7/1992 | Huynh-Tran | 428/414 |
| 5,374,668 | 12/1994 | Kanemura et al. | 523/451 |
| 5,608,115 | 3/1997 | Okazaki et al. | 568/61 |

FOREIGN PATENT DOCUMENTS 490778  6/1992  European Pat. Off. .

OTHER PUBLICATIONS

Patent Abstracts of Japan, vol. 015, No. 052 (C–0803), Feb. 7, 1991 & JP02283731 (Toray Ind. Inc.) Nov. 21, 1990 *abstract*.

Patent Abstracts of Japan, vol. 015, No. 256 (C–0845), Jun. 28, 1991 & JP03084031 (Mitsui Toatsu Chemicals, Inc.), Apr. 9, 1991 *abstract*.

*Primary Examiner*—Melvyn I. Marquis
*Assistant Examiner*—D. Aylward
*Attorney, Agent, or Firm*—Burns, Doane, Swecker & Mathis, LLP

[57] ABSTRACT

A composition for polysulfide-based resin comprising a polythiol having 4 or more functional groups and a compound having a reactive unsaturated bond(s) and/or b epoxy group(s) and/or c iso(thio)cyanato group(s) in one molecule (however, $a+b+c \geq 2$, and a and b are not simultaneously 0). A polysulfide-based resin obtained by curing the composition, an optical material comprising the resin, a lens consisting of the optical material and a method for producing the polysulfide-based resin are also set forth.

15 Claims, No Drawings

POLYSULFIDE-BASED RESIN COMPOSITION, POLYSULFIDE-BASED RESIN, AND OPTICAL MATERIAL COMPRISING THE RESIN

BACKGROUND OF THE INVENTION

1. Field of the Invention

The present invention relates to a composition for a polysulfide-based resin which has a high refractive index and which has extremely low dispersion properties, is excellent in heat resistance, impact resistance and scratch resistance, and emits far less sulfur odor at a monomer handling step and at a subsequent working step. Furthermore, the present invention also relates to the polysulfide-based resin, and an optical material, particularly a lens comprising the resin.

2. Description of the Related Art

Plastic lenses are more lightweight, less breakable and more easily dyeable as compared with inorganic lenses, and for this reason, they have rapidly spread in the fields of optical elements such as the lenses of spectacles and cameras.

As conventional resins which have been widely used for these purposes, there are products obtained by the radical polymerization of diethylene glycol bis(allyl carbonate) (hereinafter referred to as "DAC"). These resins are characterized by being lightweight and being excellent in impact resistance, dyeability and working properties such as cutting properties and polishing properties.

However, the refractive index of the DAC lens is $n_D=1.50$, which is lower as compared with the organic lens ($n_D=1.52$), and in order to obtain optical characteristics equal to those of the organic lens, it is necessary to increase the center thickness, the edge thickness and the curvature of the lens, and when such requirements are met, the lens is unavoidably thickened on the whole. Therefore, a lens having a higher refractive index has been desired.

The present inventors have already found 1,2-bis(2-mercaptoethylthio)-3-mercaptopropane (hereinafter referred to as "GST") and have also found that a resin having a high refractive index which emits far less sulfur odor at a handling step and at a working step can be obtained by reacting this GST with a compound having two or more reactive unsaturated bonds in one molecule (Japanese Patent Application Laid-open No. 84031/1991). The resin using this GST has the excellent optical characteristics, but the heat resistance of the resin is not sufficient. For example, this kind of resin has a problem that the deformation of its lens easily occurs at a post-step such as dyeing in which heat at about 60 to 90° C. is usually applied to the lens. In addition, depending upon its use purpose, the resin is also insufficient in impact resistance and has no practical scratch resistance.

Furthermore, in Japanese Patent Application Laid-open No. 26089/1995, there have been disclosed a polymer composition for casting which comprises a polythiol containing GST and an aromatic olefin monomer such as divinylbenzene, and a lens comprising the polymer. However, this kind of lens is poor in impact resistance, and what is worse, it does not have practical scratch resistance, either.

Additionally, in Japanese Patent Application Laid-open No. 25240/1993, a composition for lenses has been suggested which comprises a polymer of a polyisocyanate compound, a polythiol compound and a polyene compound. However, in this publication, it has been described that the amount of the polyene compound to be used is preferably 50% by weight or more, and if the polyene compound is used in an decreased amount, sufficient heat resistance and surface hardness cannot be obtained. In addition, when the polyene compound is used in an amount within a use range described herein, the impact resistance of the formed lens having a thickness of 1.5 mm is at most 36 g according to an iron ball dropping test from a height of 127 cm, and this value does not mean that the lens has the sufficient impact resistance. Besides, the obtained lens is breakable and does not possess practical scratch resistance.

SUMMARY OF THE INVENTION

Under such circumstances, the present invention has been intended, and an object of the present invention is to provide a novel polysulfide resin which has extremely low dispersion properties and a high refractive index and which is excellent in impact resistance, scratch resistance and heat resistance and which is suitable as a material for optical element materials such as the lenses of spectacles and cameras, a glazing material, a coating material and an adhesive material.

Another object of the present invention is to provide an optical material comprising this polysulfide resin, particularly a lens which can solve the above-mentioned problems.

The present inventors have intensively investigated with the intention of achieving these objects, and as a result, the present invention comprising the under-mentioned constitution has been attained.

That is to say, the aspects of the present invention are directed to (1) a polysulfide-based resin composition which comprises a polythiol having 4 or more of functional groups represented by any of formulae (1) to (3):

Formula (1) being:

wherein each of $R_1$, $R_2$, $R_3$ and $R_4$ is selected from H,

—$CH_2SH$, —$CH_2SCH_2CH_2SH$,

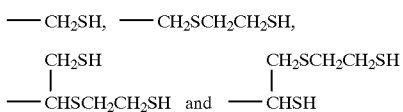

but when any one of $R_1$, $R_2$, $R_3$ and $R_4$ is H, any one of the others is

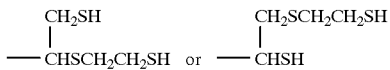

and when any two of $R_1$, $R_2$, $R_3$ and $R_4$ are H, the other two groups are selected from

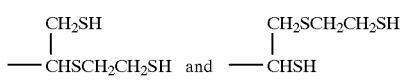
and and 3 or more of $R_1$, $R_2$, $R_3$ and $R_4$ are not H,
Formula (2) being:

 (2)

wherein m is an integer of 1 to 3, and
Formula (3) being:

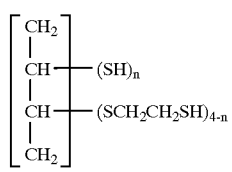 (3)

wherein n is an integer of 0 to 3, and a compound having a reactive unsaturated bond(s) and/or b epoxy group(s) and/or c iso(thio)cyanato group (s) in one molecule, with the proviso that the sum of a, b and c is not less than 2 and a and b are not simultaneously 0;

(2) the resin composition according to the above-mentioned (1) wherein the compound having a reactive unsaturated bond(s) and/or b epoxy group(s) and/or c iso(thio)cyanato group(s) in one molecule is a compound having two or more of the reactive unsaturated bond(s) and/or the epoxy group(s) in all in one molecule;

(3) the resin composition according to the above-mentioned (1) wherein the compound having a reactive unsaturated bond(s) and/or b epoxy group(s) and/or c iso(thio)cyanato group(s) in one molecule is a compound having one or more reactive unsaturated bond(s) or epoxy group(s) and one or more iso(thio)cyanato group(s) in one molecule;

(4) the resin composition according to the above-mentioned (1) wherein the compound having a reactive unsaturated bond(s) and/or b epoxy group(s) and/or c iso(thio)cyanato group(s) in one molecule is a compound having two or more reactive unsaturated bonds;

(5) the resin composition according to the above-mentioned (4) which contains the compound having two or more reactive unsaturated bonds as well as a polyiso(thio)cyanate compound;

(6) the resin composition according to the above-mentioned (5) which contains any of the polythiols (1), (2) and (3) having 4 or more functional groups as well as a thiol compound having another thiol group or a hydroxyl group;

(7) the resin composition according to the above-mentioned (1) wherein the compound having a reactive unsaturated bond(s) and/or b epoxy group(s) and/or c iso(thio)cyanato group(s) in one molecule is one or two of compounds represented by formulae (4) to (8):

Formula (4) being:

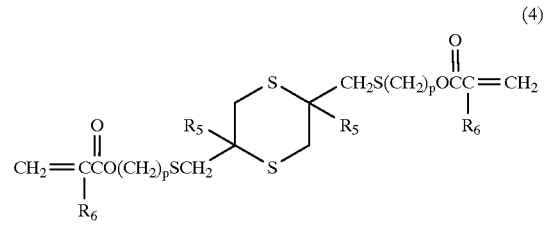 (4)

wherein p is an integer of 1 to 4; $R_5$ is a hydrogen atom or a methyl group; and $R_6$ is a hydrogen atom or a methyl group, Formula (5) being:

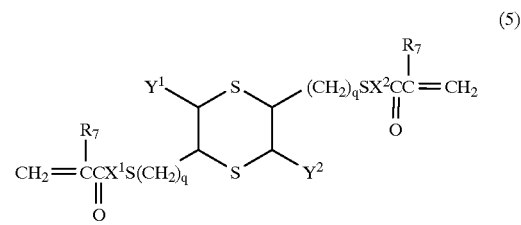 (5)

wherein $X^1$ is $-(SCH_2CH_2)_a-$; $X^2$ is $-(CH_2CH_2S)_a-$; a is an integer of 0 to 2; and each of $Y^1$ and $Y^2$ is independently a hydrogen atom or

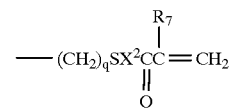

q is an integer of 0 to 5; and $R_7$ is a hydrogen atom or a methyl group,

Formula (6) being:

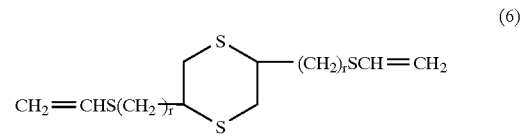 (6)

wherein r is an integer of 0 to 3,

Formula (7) being:

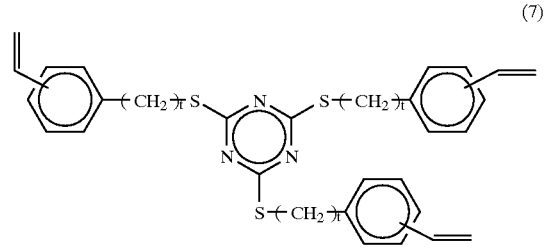 (7)

wherein t is an integer of 1 to 5,

Formula (8) being:

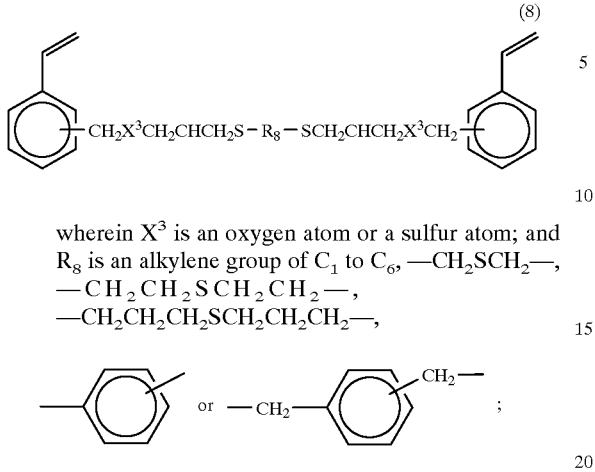

wherein $X^3$ is an oxygen atom or a sulfur atom; and $R_8$ is an alkylene group of $C_1$ to $C_6$, $-CH_2SCH_2-$, $-CH_2CH_2SCH_2CH_2-$, $-CH_2CH_2CH_2SCH_2CH_2CH_2-$,

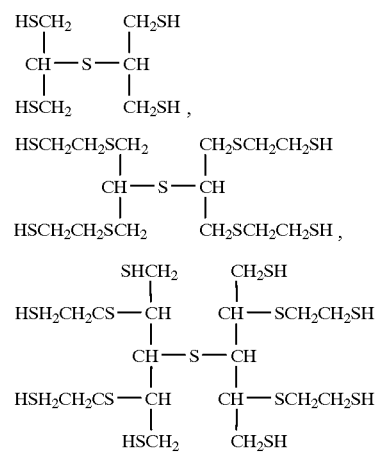

(8) the resin composition according to the above-mentioned (1) wherein a functional group molar ratio of (the reactive unsaturated bond+the epoxy group+the iso(thio)cyanato group)/(the mercapto group) is in the range of 0.5 to 20.0;

(9) the resin composition according to the above-mentioned (6) wherein a functional group molar ratio of (the reactive unsaturated bond+the iso(thio)-cyanato group)/(the mercapto group+the hydroxyl group) is in the range of 1.0 to 3.0;

(10) the resin composition according to the above-mentioned (2) wherein a functional group molar ratio of (the reactive unsaturated bond+the epoxy group)/(the mercapto group) is in the range of 0.5 to 10.0;

(11) a polysulfide-based resin which is obtainable by curing a composition in any one of the above-mentioned (1) to (10);

(12) an optical material which comprises the polysulfide-based resin in the above-mentioned (11);

(13) a lens which comprises the optical material in the above-mentioned (12);

(14) a process for preparing a polysulfide-based resin which comprises the step of applying heat and/or ultraviolet light and/or visible light to a composition in any one of the above-mentioned (1) to (10) to cure the composition; and

(15) a process for preparing a polysulfide-based resin which comprises the step of cast polymerizing a composition in any one of the above-mentioned (1) to (10).

DETAILED DESCRIPTION OF THE PREFERRED EMBODIMENTS

The present invention will be described in detail.

Examples of a polythiol having 4 or more functional groups represented by the above-mentioned formula (1) which can be used in the present invention include the following compounds:

(in the case of $R_1=R_2=R_3=R_4$)

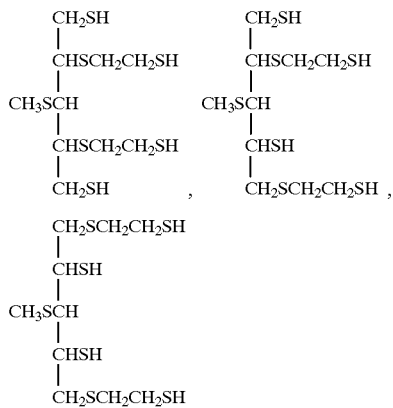

(in the case or $R_1 = R_2 = H$)

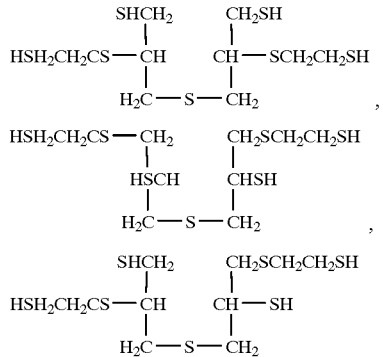

(in the case of $R_1 = R_4 = H$)

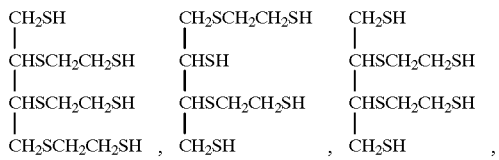

(in the case that any one of $R_1$ to $R_4$ is H)

$$\begin{array}{lll}
CH_2SH & CH_2SCH_2CH_2SH & CH_2SH \\
CHSCH_2CH_2SH & CHSH & CHSCH_2CH_2SH \\
CHSCH_2CH_2SH & CHSCH_2CH_2SH & CHSCH_2CH_2SH \\
CH_2SCH_2CH_2SH\,, & CH_2SH\,, & CH_2SH\,,
\end{array}$$

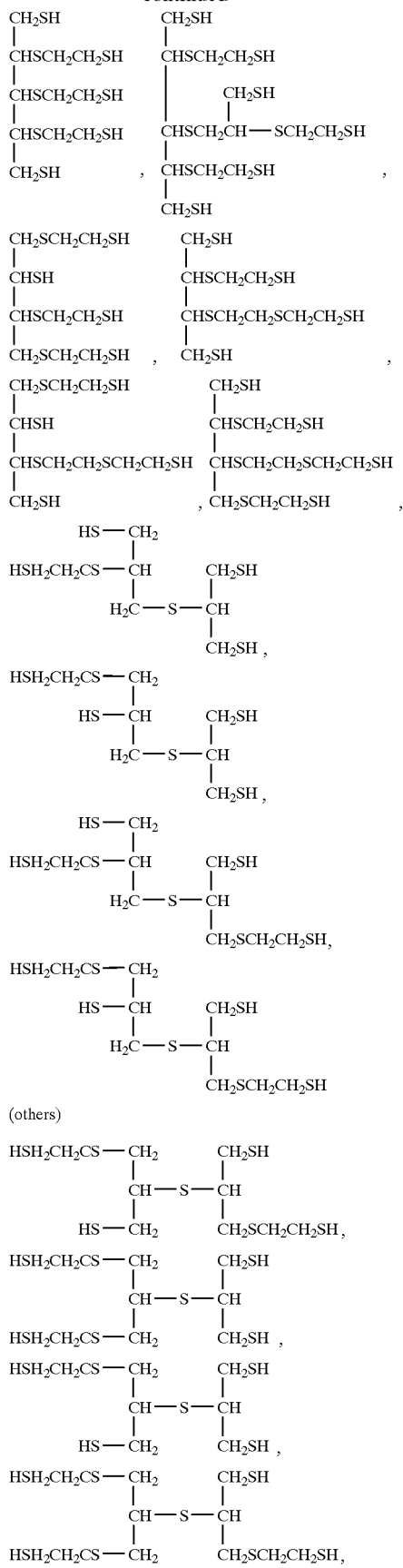
(others)

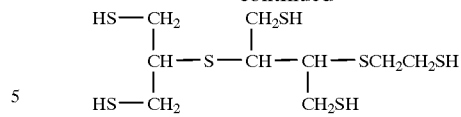

Examples of a polythiol represented by the above-mentioned formula (2) include the following compounds:

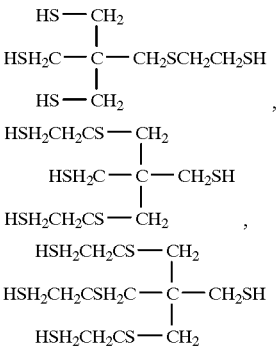

Examples of a polythiol represented by the above-mentioned formula (3) include the following compounds:

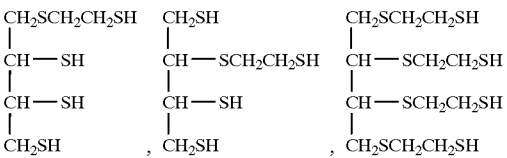

The polythiols mentioned above may be used singly or in a mixture of two or more thereof. Furthermore, for the purpose of modifying the resin, there may be added an active hydrogen-containing monomer or polymer such as a hydroxy compound, a mercapto compound or a mercapto compound having a hydroxyl group, in addition to the above-mentioned polythiol.

In the present invention, a compound having a reactive unsaturated bond(s) and/or b epoxy group(s) and/or c iso(thio)cyanato group(s) in one molecule (however, $a+b+c \geq 2$, and a and b are not simultaneously 0) can be used, and examples of the compound include (I) a compound having two or more of the reactive unsaturated bond(s) and/or the epoxy group(s) in one molecule, and (II) a compound having one or more of the reactive unsaturated bond(s) and/or the epoxy group(s) and one or more of iso(thio)cyanato group(s) in one molecule. Next, these compounds will be described in detail as follows.

Examples of the compound (I) having two or more of the reactive unsaturated bond(s) and/or the epoxy group(s) in one molecule include compounds having two or more of an acryloyl group, a methacryloyl group, a vinyl group, an allyloxy group, an allyl group, an allylcarbonate group, an allylidene group, a glycidyl group and a glycidyloxy group in all in one molecule. These compounds can be roughly classified into (A) acetal compounds, (B) bisphenol compounds, (C) isocyanuric acid derivatives, (D) triazine compounds, (E) other polyvalent alcohol or polyvalent thiol derivatives, and (F) other compounds. Next, these compounds in the thus classified groups will be described group by group.

(A) Acetal compounds:

The acetal compounds which can be used in the present invention are unsaturated cycloacetal compounds each having at least two of unsaturated cycloacetal groups represented by (unsaturated dioxane type)

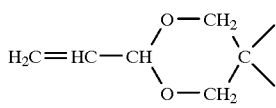

and/or (unsaturated dioxolane type)

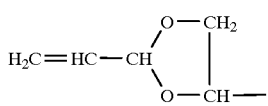

in one molecule.

Examples of the acetal compounds which can be suitably utilized in a polysulfide resin composition of the present invention include compounds mentioned in the following (i) to (v).

(i) Diallylidenepentaerythritol, triallylidenesorbitol, diallylidene-2,2,6,6-tetramethylol cyclohexanone or a mixture thereof.

(ii) A reaction product of diallylidenepentaerythritol and/or diallylidene-2,2,6,6-tetramethylolcyclo hexanone with (a) a polyol such as ethylene glycol, triethylene glycol, propylene glycol, dipropylene glycol, 1,3-butanediol, 1,6-hexanediol, polyethylene glycol, hydrogenated bisphenol A, bisphenol A-ethylene oxide adduct, bisphenol A-propylene oxide adduct, trimethylolpropane, trimethylolethane, pentaerythritol, dipentaerythritol, an ethylene oxide adduct of phthalic acid, isophthalic acid or terephthalic acid, or a polyester having a molecular weight of 1500 or less and a terminal hydroxide group; (b) a polythiol such as dithioglycol, dipentenedimercaptan, ethylcyclohexyl-dimercaptan or 1,6-hexanedimercaptan, or a compound having two or more of a hydroxyl group(s) and/or a mercapto group(s) in all in one molecule such as an ester compound obtained by reacting thioglycollic acid, β-mercaptopropionic acid or mercaptosuccinic acid with the above-mentioned polyol; (c) a phenol-type compound such as phenol, cresol, novolak obtained by formalin condensation thereof, bisphenol F or bisphenol A; (d) an arylsulfonamide such as benzenesulfonamide, o-toluenesulfonamide or chlorobenzenesulfonamide; or (e) a mixture thereof.

(iii) A reaction product of monoallylidene-trimethylolpropane and/or monoallylidenetrimethylolpropane with an isocyanate compound such as tolylene diisocyanate, polyalkyleneallyl isocyanate, metaphenylene diisocyanate or isophorone diisocyanate.

(iv) An addition half-esterified product of monoallylidenetrimethylolpropane and/or monoallylidenetrimethylolethane with succinic anhydride, maleic anhydride, itaconic anhydride, phthalic anhydride, tetrahydrophthalic anhydride or hexahydrophthalic anhydride.

(v) A compound obtained by reacting an addition half-esterified product of monoallylidenetrimethylolpropane and/or monoallylidenetrimethylolethane with a carboxylic anhydride, with an epoxy compound such as a polyvalent glycidyl ester type epoxy compound or a glycidyl ester type epoxy compound of phthalic acid, adipic acid or a dimeric acid.

(B) Bisphenol compounds:

The bisphenol compounds which can be used in the present invention are bisphenols each having at least two of a vinyl group, an acryloyl group, a methacryloyl group, an allyloxy group, an allylcarbonate group, a glycidyl group and a glycidyloxy group in all in one molecule. Examples of the bisphenol compounds which can be utilized in the present invention include compounds represented by formula (9):

$$(R_9)_{p1}-A-(R_{10})_{p2} \qquad (9)$$

wherein each of p1 and p2 is an integer of 1 to 4; and A is a group having any of the following structures (a) to (f):

(a)

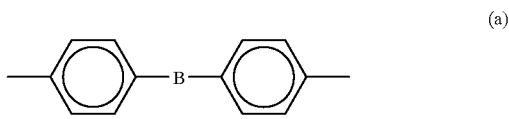
(b)

(c)

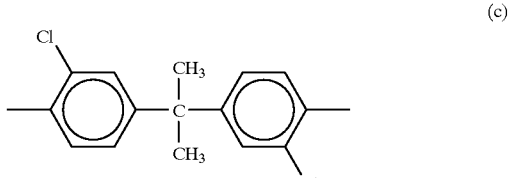
(d)

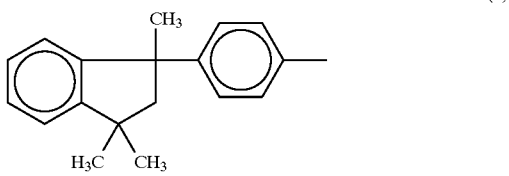
(e)

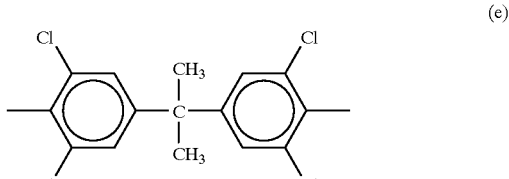
(f)

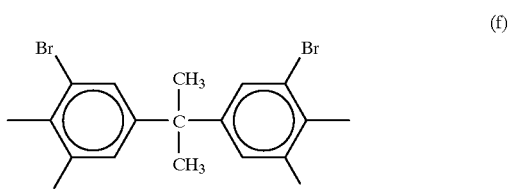

Here, B in formula (a) represents a linking group having any of structures (g) to (o):

(a)

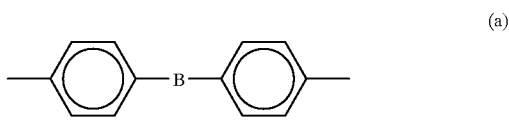

(b)

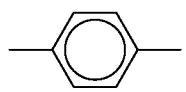

(c)

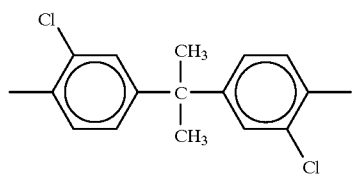

(d)

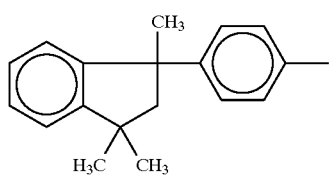

(e)

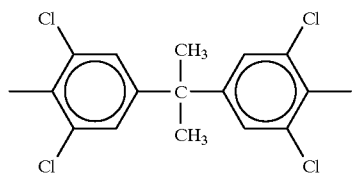

(f)

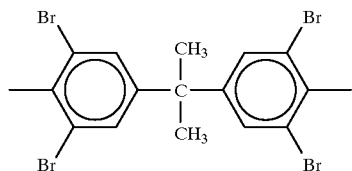

(m)

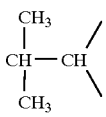

(n)

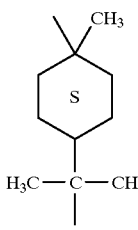

(o)

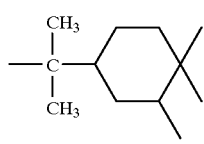

Furthermore, each of $R_9$ and $R_{10}$ in formula (9) is a glycidyloxy group or a group having the structure represented by formula (10)

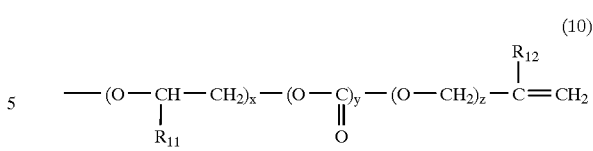

wherein each of $R_{11}$ and $R_{12}$ is a hydrogen atom, a methyl group, an ethyl group, a chloromethyl group or a bromomethyl group; x is an integer of 0 to 5; and each of y and z is 0 or 1.

(C) Isocyanuric acid derivatives:

The isocyanuric acid derivatives which can be used in the present invention are the derivatives of isocyanuric acid which have at least two of an acryloyl group, a methacryloyl group, an allyloxy group, an allyl group, an allylcarbonate group and an epoxy group in one molecule. Examples of the isocyanuric acid derivatives which can be utilized in the present invention include glycidyl ester compounds of polyvalent alcohols represented by the following (i) to (iii), isocyanuric acid derivatives obtained by reacting these polyvalent alcohols with acrylic acid, methacrylic acid, allyl chloroformate, allyl alcohol, halogenated allyls, glycidyl acrylate and glycidyl methacrylate, and glycidyl-esterified product of isocyanuric acid.

(i) A polyvalent alcohol obtained by adding an alkylene oxide such as ethylene oxide or propylene oxide to isocyanuric acid.

(ii) A polyvalent alcohol obtained by adding epichlorohydrin to isocyanuric acid, followed by dehydrochlorination.

(iii) A polyvalent alcohol obtained by introducing methylol into a reaction product of isocyanuric acid and acrylamide.

Typical examples of these isocyanuric acid derivatives include tris(2-acryloyloxyethyl) isocyanurate, tris(2-methacryloyloxyethyl) isocyanurate, di(2-acryloyloxyethyl)-2-hydroxyethyl isocyanurate, di(2-methacryloyloxyethyl)-2-hydroxyethyl isocyanurate, di(2-acryloyloxyethyl)-2-acetoxyethyl isocyanurate, di(2-methacryloyloxyethyl)-2-acetoxyethyl isocyanurate, di(2-acryloyloxyethyl)allyl isocyanurate, di(2-methacryloyloxyethyl)allyl isocyanurate and triallyl isocyanurate.

(D) Triazine compounds:

The triazine compounds which can be used in the present invention are triazine compounds having at least two of an acryloyl group, a methacryloyl group, an allyloxy group, an allyl group, an allylcarbonate group and a glycidyl group in one molecule, compounds represented by formula (11), and compounds obtained by oligomerizing them via formalin, a polyvalent alcohol or ethylene oxide:

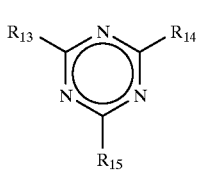

wherein each of $R_{13}$, $R_{14}$ and $R_{15}$ is hydrogen, an alkyl group, an allyl group, a (meth)acryl-modified alkoxy group, a glycidyl group, a glycidyloxyl group or

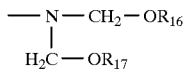

wherein each of $R_{16}$ and $R_{17}$ is hydrogen, an alkyl group such as a methyl group, an ethyl group or a propyl group, an aromatic alkyl group such as a benzyl group, a glycidyl group or a group represented by the above-mentioned formula (10).

Typical examples of these triazine compounds include (i) N,N'-bis[(meth)acryloylmethyl]-N,N',N'',N''-tetrakis (methoxymethyl)melamine and N,N',N'',N''-tetrakis [(meth)acryloylmethyl]-N,N'-bis(ethoxymethyl) melamine, (ii) N,N,N',N',N'',N''-hexakis[2-(meth) acryloylethoxymethyl]melamine, (iii) 2,4-bis[[N,N'-bis[(2-(meth)acryloylethoxy)- ethoxymethyl]]amino]-6-ethoxy-1,3,5-triazine, (iv) 2,4-bis[[p-(2-(meth)acryloylethoxy)phenyl-oxy]-6- [[N,N'-bis[(2-(meth)acryloylethoxy)ethoxymethyl]]- amino]-6-ethoxy-1,3,5-triazine, (v) 2,2-bis[4-[[N,N',N''-tris(methoxymethyl)-N',N''-(2- (meth)aryloylethoxy)methyl]melaminyloxy]phenyl]- propane, and (vi) triallyl cyanurate.

Furthermore, examples of the polyvalent alcohol for use in the oligomerization include ethylene glycol, diethylene glycol, propylene glycol, 1,3-butanediol, 1,6-hexanediol, hydrogenated bisphenol A, trimethylolpropane, pentaerythritol, and ethylene oxide adducts of phthalic acid, isophthalic acid or terephthalic acid.

(E) Other polyvalent alcohol or polyvalent thiol derivatives:

Examples of the polyvalent alcohol derivatives other than mentioned above which can be used in the present invention include products obtained by reacting polyvalent alcohols with acrylic acid, methacrylic acid, allyl chloroformate, allyl alcohol, halogenated allyls, glycidyl acrylate and glycidyl methacrylate, and glycidyl-etherified products. Examples of the polyvalent alcohols include the compounds mentioned in the following (i) and (ii).

(i) Aliphatic polyvalent alcohols such as ethylene glycol, trimethylolpropane, pentaerythritol, propylene glycol, glycerin, sorbitol, neopentyl glycol, dichloroneopentyl glycol and dipentaerythritol.

(ii) Sulfur-containing polyvalent alcohols such as [4- (hydroxyethoxy)phenyl] sulfide, [4-(hydroxypropoxy)- phenyl] sulfide, bis[4-(2,3-dihydroxypropoxy)phenyl] sulfide, bis[4-(4-hydroxyethoxy)-6-butylphenyl] sulfide, di(2-hydroxyethyl) sulfide, 1,2-bis(2- hydroxyethylmercapto)ethane, bis(2-hydroxyethyl) disulfide, 1,4-dithian-2,5-diol, bis(2,3- dihydroxypropyl) sulfide, tetrakis(4-hydroxy-2- thiabutyl)methane, 4,4-thiobis(4-tert-butyl-3- methylphenol) and 1,3-bis(2-hydroxyethylthioethyl) cyclohexane, and polyvalent alcohols obtained by adding alkylene oxides such as ethylene oxide and propylene oxide to the above-mentioned polyvalent alcohols.

Examples of the polyvalent thiol derivatives which can be used in the present invention include products obtained by reacting polyvalent thiols with acrylic acid, methacrylic acid, allyl chloroformate, allyl alcohol, halogenated allyls, glycidyl acrylate and glycidyl methacrylate, and products obtained by the glycidyl-sulfidation of the polyvalent thiols.

Here, examples of the polyvalent thiols include the polythiols and compounds each having at least one sulfur atom in addition to a mercapto group, and for example, aliphatic polythiols such as methanedithiol, 1,2- ethanedithiol, 1,1-propanedithiol, 1,3-propanedithiol, 2,2- propanedithiol, 1,6-hexanedithiol, 1,2,3-propanetrithiol, 1,1-cyclohexanedithiol, 1,2-cyclohexanedithiol, 2,2- dimethylpropane-1,3-dithiol, 3,4-dimethoxybutane-1,2- dithiol, 3,6-dioxaoctane-1,8-dimercaptan, 2-methylcyclohexane-2,3-dithiol, bicyclo[2.2.1]-hepta-exo- cis-2,3-dithiol, 1,1-bis(mercaptomethyl)cyclohexane, thiomalic acid bis(2-mercaptoethyl ester), 2,3- dimercaptosuccinic acid (2-mercaptoethyl ester), 2,3- dimercapto-1-propanol-(2-mercaptoacetate), 2,3- dimercaptol-propanol-(3-mercaptopropionate), diethylene glycol bis(2-mercaptoacetate), diethylene glycol bis(3- mercaptopropionate), 1,2-dimercaptopropyl methyl ether, 2,3-dimercaptopropyl methyl ether, 2,2-bis (mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2- mercaptoacetate), trimethylolpropane tris(3- mercaptopropionate), pentaerythritol tetrakis(2- mercaptoacetate), pentaerythritol tetrakis(3- mercaptopropionate), 1-(1'-mercaptomethylthio)-2,3- dimercaptopropane, 1-(2'-mercaptoethylthio)-2,3- dimercaptopropane, 1-(3'-mercaptopropylthio)-2,3- dimercaptopropane, 1-(4'-mercaptobutylthio)-2,3- dimercaptopropane, 1-(5'-mercaptopentylthio)-2,3- dimercaptopropane, 1-(6'-mercaptohexylthio)-2,3- dimercaptopropane, 1,2-bis(1'-mercaptomethylthio)-3- mercaptopropane, 1,2-bis(2'-mercaptoethylthio)-3- mercaptopropane, 1,2-bis(3'-mercaptopropylthio)-3- mercaptopropane, 1,2-bis(4'-mercaptobutylthio)-3- mercaptopropane, 1,2-bis(5'-mercaptopentylthio)-3- mercaptopropane, 1,2-bis(6'-mercaptohexylthio)-3- mercaptopropane, 1,2,3-tris(1'-mercaptomethylthio) propane, 1,2,3-tris(2'-mercaptoethylthio)propane, 1,2,3-tris (3'-mercaptopropylthio)propane, 1,2,3-tris(4'- mercaptobutylthio)propane, 1,2,3-tris(5'- mercaptopentylthio)propane and 1,2,3-tris(6'- mercaptohexylthio)propane; aromatic polythiols such as 1,2-dimercaptobenzene, 1,3-dimercaptobenzene, 1,4- dimercaptobenzene, 1,2-bis(mercaptomethyl)benzene, 1,3- bis(mercaptomethyl)benzene, 1,4-bis (mercaptomethyl) benzene, 1,2-bis(mercaptoethyl)benzene, 1,3-bis (mercaptoethyl)benzene, 1,4-bis(mercaptoethyl)benzene, 1,2-bis(mercaptomethyloxy)benzene, 1,3-bis (mercaptomethyloxy)benzene, 1,4-bis(mercaptomethyloxy) benzene, 1,2-bis(mercaptoethyloxy)benzene, 1,3-bis (mercaptoethyloxy)benzene, 1,4-bis(mercaptoethyloxy)- benzene, 1,2,3-trimercaptobenzene, 1,2,4- trimercaptobenzene, 1,3,5-trimercaptobenzene, 1,2,3-tris (mercaptomethyl)benzene, 1,2,4-tris(mercaptomethyl) benzene, 1,3,5-tris (mercaptomethyl)benzene, 1,2,3-tris (mercaptoethyl)-benzene, 1,2,4-tris(mercaptoethyl)benzene, 1,3,5-tris-(mercaptoethyl)benzene, 1,2,3-tris (mercaptomethyleneoxy)-benzene, 1,2,4-tris (mercaptomethyleneoxy)benzene, 1,3,5-tris (mercaptomethyleneoxy)benzene, 1,2,3-tris (mercaptoethyleneoxy)benzene, 1,2,4-tris (mercaptoethyleneoxy)benzene, 1,3,5-tris (mercaptoethyleneoxy)benzene, 1,2,3,4- tetramercaptobenzene, 1,2,3,5-tetramercaptobenzene, 1,2,4, 5-tetramercaptobenzene, 1,2,3,4-tetrakis(mercaptomethyl) benzene, 1,2,3,5-tetrakis(mercaptomethyl)benzene, 1,2,4,5- tetrakis(mercaptomethyl)benzene, 1,2,3,4-tetrakis- (mercaptoethyl)benzene, 1,2,3,5-tetrakis(mercaptoethyl)-benzene, 1,2,4,5-tetrakis(mercaptoethyl)benzene, 1,2,3,4-tetrakis (mercaptomethyleneoxy)benzene, 1,2,3,5-tetrakis-(mercaptomethyleneoxy)benzene, 1,2,4,5-tetrakis (mercaptomethyleneoxy)benzene, 1,2,3,4-tetrakis (mercaptoethyleneoxy)benzene, 1,2,3,5-tetrakis (mercaptoethyleneoxy)benzene, 1,2,4,5-tetrakis (mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene-dimethanethiol, 1,3-di(p-methoxyphenyl)-propane-2,2-dithiol, 1,3-diphenylpropane-2,2-dithiol, phenylmethane-l,l-dithiol and 2,4-di(p-mercaptophenyl)-pentane;

halogenated aromatic polythiols including chlorinated or brominated polythiols such as 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachloro-1, 5-bis(mercaptomethyl)benzene;

heterocyclic polythiols such as 2-methylamino-4,6-dithiolsym-triazine, 2-ethylamino-4,6-dithiol-sym-triazine, 2-amino-4,6-dithiol-sym-triazine, 2-morphorlino-4,6-dithiolsym-triazine, 2-cyclohexylamino-4,6-dithiol-sym-triazine, 2-methoxy-4,6-dithiol-sym-triazine, 2-phenoxy-4, 6-dithiol-sym-triazine, 2-thiobenzeneoxy-4,6-dithiol-sym-triazine and 2-thiobutyloxy-4,6-dithiol-sym-triazine; and halogen-substituted heterocyclic polythiols including chlorine-substituted or bromine-substituted derivatives thereof.

Polythiols having 2 or more functional groups containing at least one sulfur atom in addition to mercapto groups include aromatic polythiols such as 1,2-bis (mercaptomethylthio)benzene, 1,3-bis(mercaptomethylthio) benzene, 1,4-bis(mercaptomethylthio)benzene, 1,2-bis (mercaptoethylthio)benzene, 1,3-bis(mercaptoethylthio) benzene, 1,4-bis(mercaptoethylthio)benzene, 1,2,3-tris (mercaptomethylthio)benzene, 1,2,4-tris (mercaptomethylthio)benzene, 1,3,5-tris (mercaptomethylthio)benzene, 1,2,3-tris(mercaptoethylthio) benzene, 1,2,4-tris-(mercaptoethylthio)benzene, 1,3,5-tris (mercaptoethylthio)benzene, 1,2,3,4-tetrakis (mercaptomethylthio)benzene, 1,2,3,5-tetrakis (mercaptomethylthio)benzene, 1,2,4,5-tetrakis (mercaptomethylthio)benzene, 1,2,3,4-tetrakis (mercaptoethylthio)benzene, 1,2,3,5-tetrakis-(mercaptoethylthio)benzene, 1,2,4,5-tetrakis (mercaptoethylthio)benzene and aromatic ring alkylated derivatives of these polythiols;

aliphatic polythiols such as bis(mercaptomethyl) sulfide, bis(mercaptoethyl) sulfide, bis(mercaptopropyl) sulfide, bis (mercaptomethylthio)methane, bis(2-mercaptoethylthio)-methane, bis(3-mercaptopropylthio)methane, 1,2-bis (mercaptomethylthio)ethane, 1,2-bis(2-mercaptoethylthio) ethane, 1,2-bis(3-mercaptopropylthio)ethane, 1,3-bis (mercaptomethylthio)propane, 1,3-bis(2-mercaptoethylthio) propane, 1,3-bis(3-mercaptopropylthio)propane, 1,2,3-tris-(mercaptomethylthio)propane, 1,2,3-tris(2-mercaptoethylthio)propane, 1,2,3-tris(3-mercaptopropylthio)propane, tetrakis (mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithiane, bis(mercaptomethyl) disulfide, bis(mercaptoethyl) disulfide and bis(mercaptopropyl) disulfide, esters of thioglycolic acid and mercaptopropionic acid with these compounds, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithian-2,5-diol bis(2-mercaptoacetate), 1,4-dithiane-2,5-diol bis(3-mercaptopropionate), thiodiglydolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester) and dithiodipropionic acid bis(2,3-dimercaptopropyl ester); halogen-substituted compounds thereof such as chlorine-substituted or bromine-substituted derivatives;

and heterocyclic compounds such as 3,4-thiophenedithiol, 2,5-dimercapto-1,3,4-thiadiazole, 2,5-dimercapto-1,4-dithane and 2,5-dimercaptomethyl-1,4-dithiane.

Further, hydroxy-containing mercapto compounds include, for example, 2-mercaptoethanol, 3-mercapto-1,2-propanediol, glycerindi(mercaptoacetate), 1-hydroxy-4-mercaptocyclohexane, 2,4-dimercaptophenol, 2-mercaptohydroquinone, 4-mercaptophenol, 1,2-dimercapto-2-propanol, 1,3-dimercapto-2-propanol, 2,3-dimercapto-1-propanol, 1,2-dimercapto-1,3-butanediol, pentaerythritoltris-(3-mercaptopropionate), pentaerythritolmono(3-mercaptopropionate), pentaerythritolbis(3-mercaptopropionate), pentaerythritoltris(thioglycolate), pentaerythritoltetrakis(3-mercaptopropionate), hydroxymethyl-tris (mercaptoethylthiomethyl), 1-hydroxyethylthio-3-mercaptoethylthiobenzene, 4-hydroxy-4'-mercaptodiphenylsulfone, 2-(2-mercaptoethylthio)ethanol, dihydroxyethylsulfidemono(3-mercaptopropionate), dimercaptoethane mono(salicylate) and hydroxyethylthiomethyl tris(mercaptoethylthiomethyl)-methane and halogen-substituted compounds thereof such as chlorine-substituted or bromine-substituted derivatives.

Compounds having hydroxy groups and at least one sulfur atom in addition to mercapto groups include, for example, hydroxymethyltris(mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfide mono(3-mercaptopropionate), dimercaptoethane monosalicylate and hydroxyethylthiomethyl tris(mercaptoethylthiomethyl) methane; polythiols including halogen-substituted compounds thereof such as chlorine-substituted or bromine-substituted derivatives; and polyols obtained by adding alkyleneoxide such as ethylene oxide and propyleneoxide thereto.

(F) Other compounds:

Examples of the other compounds include (i) allyl esters, methallyl esters and glycidyl esters of polyvalent carboxylic acids, such as diallyl phthalate, diallyl succinate, thiodiacetic acid, thiodipropionic acid, dithiodiacetic acid, dithiodipropionic acid and malic acid, (ii) vinyl compounds such as divinylbenzene and divinyl adipate, (iii) reaction products of polyisocyanates such as isophorone diisocyanate, xylylene diisocyanate, bis-(isocyanatomethyl)cyclohexane, bis(isocyanatomethyl)-norbornene, bis(isocyanatocyclohexyl)methane, tolylene diisocyanate, m-isopropenyl-α,α'-dimethylbenzyl isocyanate, m-vinyl-α,α'-dimethylbenzyl isocyanate and 4,4'-methylenebis(phenyl isocyanate) with alcohols having unsaturated bonds such as allyl alcohol, hydroxyethyl (meth)acrylate and glycidol, (iv) polyolefin compounds such as dicyclopentadiene and dibutene, (v) glycidyl esters of carboxylic acids each having an unsaturated bond such as acrylic acid and methacrylic acid, (vi) glycidyl-etherified products of alcohols having unsaturated bonds such as allyl alcohol, methallyl alcohol and homoallyl alcohol, (vii) epoxides of polyolefins such as 1,2-epoxy-3-butene, 1,2-epoxy-4-pentene, 1,2-epoxy-5-hexene, 1,2-epoxy-6-pentene, 1,2-epoxy-7-octene, 1,2-epoxy-8-nonene and 1,2-epoxy-9-decene, (viii) alicyclic epoxides such as diglycidyl-1,2-cyclohexane dicarboxylate, 3,4-epoxycyclohexylmethyl-3,4-epoxycyclohexane carboxylate, vinylcyclohexene dioxide, bis(3,4-epoxycyclohexylmethyl) adipate and 2-(3,4-epoxycyclohexyl-5,5-spiro-3,4-epoxycyclohexanemethadioxane, and (ix) other especial compounds such as compounds mentioned in Japanese Patent Application Laid-open Nos. 145601/1991, 4211/1992, 161410/1992, 161411/1992 and 194486/1993, for example, unsaturated compounds represented by formula (4)

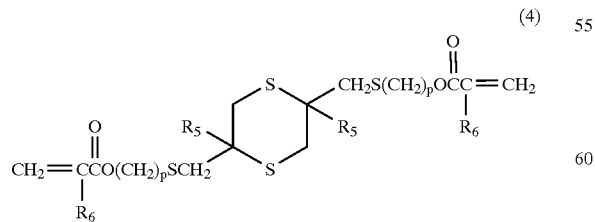

(4)

wherein p is an integer of 1 to 4; $R_5$ is a hydrogen atom or a methyl group; and $R_6$ is a hydrogen atom or a methyl group, unsaturated compounds represented by formula (5)

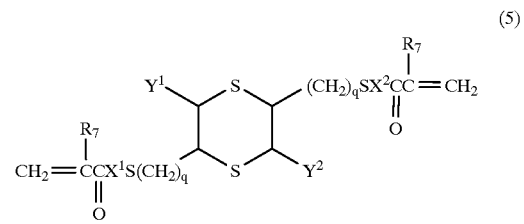

(5)

wherein $X^1$ is $-(SCH_2CH_2)_a-$; $X^2$ is $-(CH_2CH_2S)_a-$; a is an integer of 0 to 2; and each of $Y^1$ and $Y^2$ is independently a hydrogen atom or

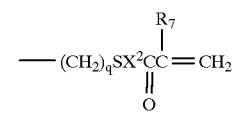

q is an integer of 0 to 5; and $R_7$ is a hydrogen atom or a methyl group, unsaturated compounds represented by formula (6)

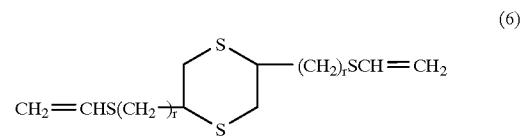

(6)

wherein r is an integer of 0 to 3, unsaturated compounds represented by formula (7)

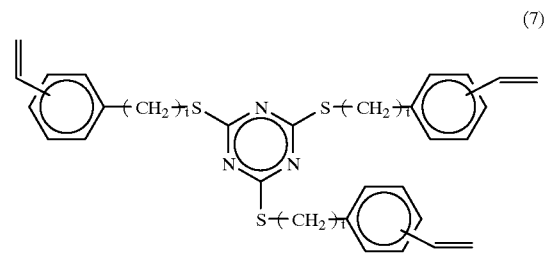

(7)

wherein t is an integer of 1 to 5, and unsaturated compounds represented by formula (8)

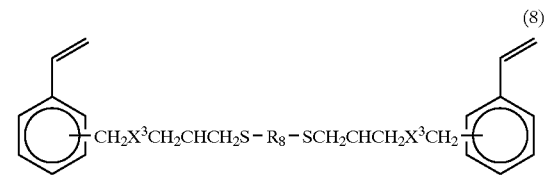

(8)

wherein $X^3$ is an oxygen atom or a sulfur atom; and $R_8$ is an alkyl group of $C_1$ to $C_6$, $-CH_2SCH_2-$, $-CH_2CH_2SCH_2CH_2-$, $-CH_2CH_2CH_2SCH_2CH_2CH_2-$,

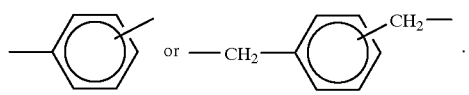

Typical examples of the unsaturated compounds represented by formula (4) include

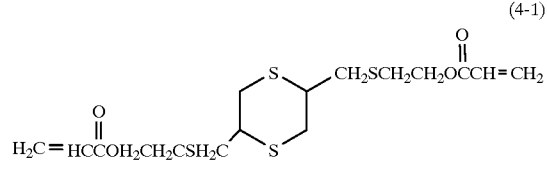
(4-1)

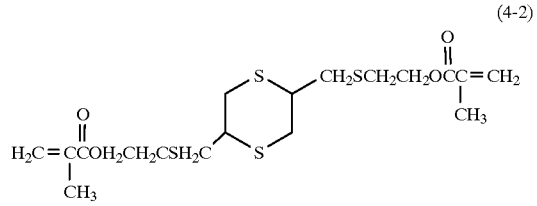
(4-2)

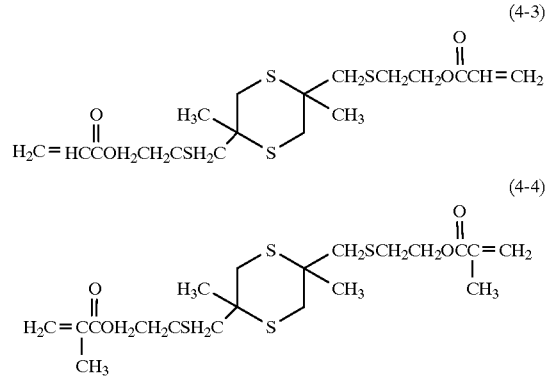
(4-3)
(4-4)

and they are not restrictive.

Typical examples of the unsaturated compounds represented by formula (5) include:

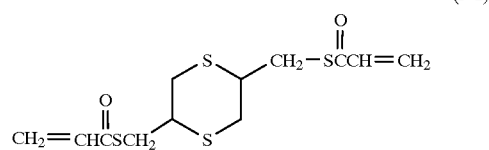
(5-1)

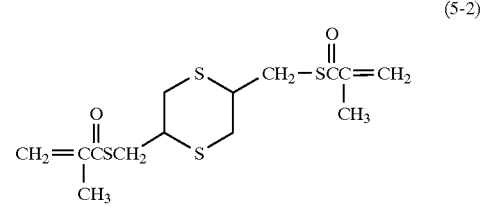
(5-2)

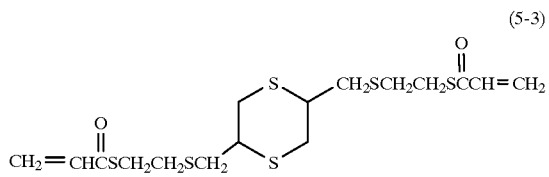
(5-3)

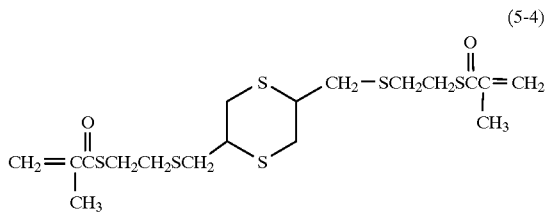
(5-4)

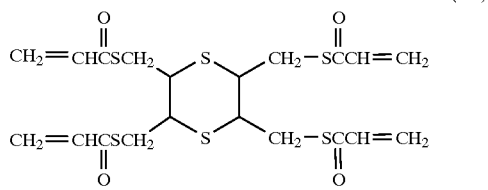
(5-5)

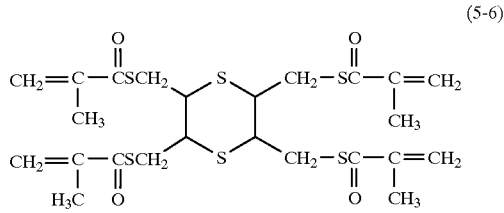
(5-6)

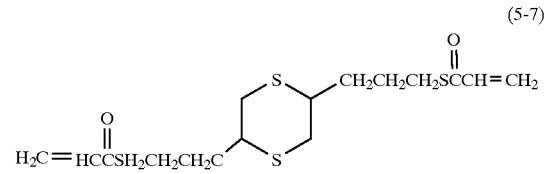
(5-7)

and they are not restrictive.

Typical examples of the unsaturated compounds represented by formula (6) include

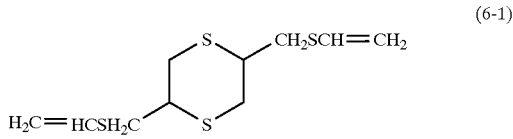
(6-1)

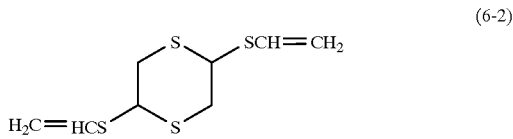
(6-2)

and they are not restrictive.

Typical examples of the unsaturated compounds represented by formula (7) include

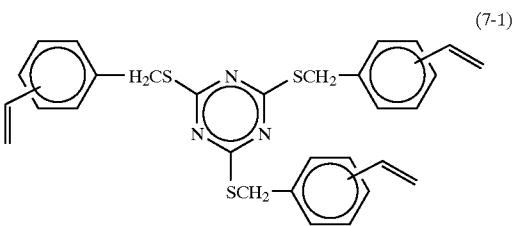
(7-1)

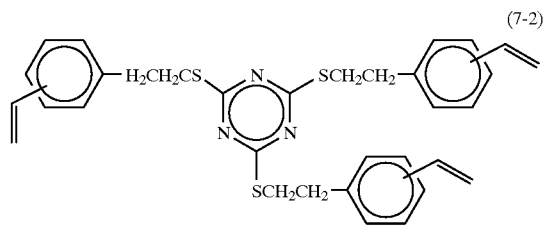
(7-2)
and they are not restrictive.
Typical examples of the unsaturated compounds represented by formula (8) include
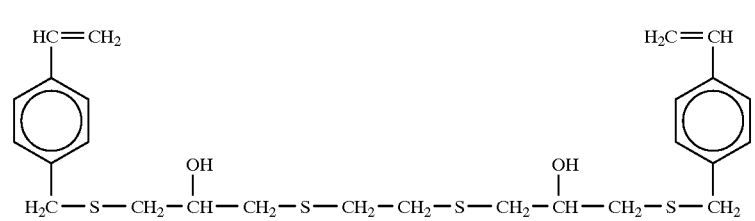
(8-1)
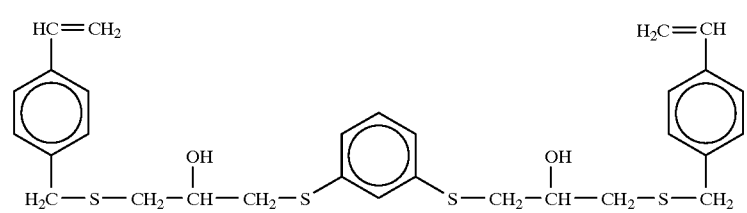
(8-2)
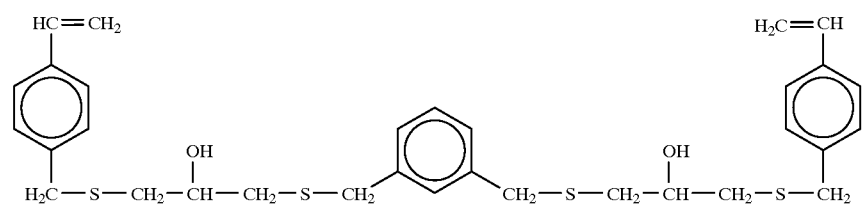
(8-3)
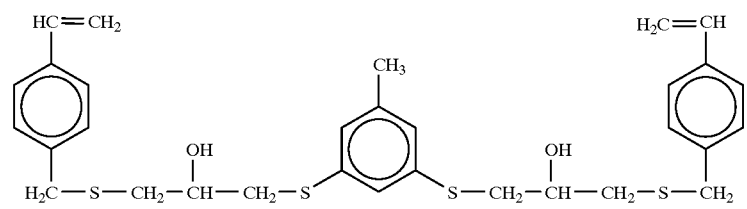
(8-4)
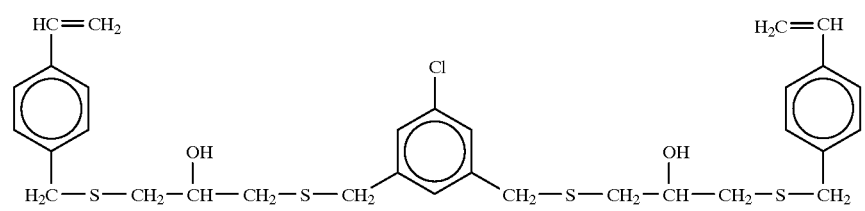
(8-5)
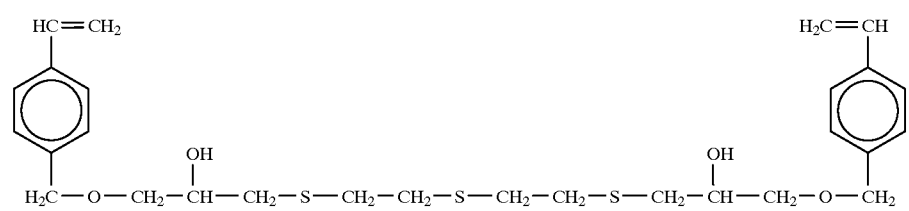
(8-6)

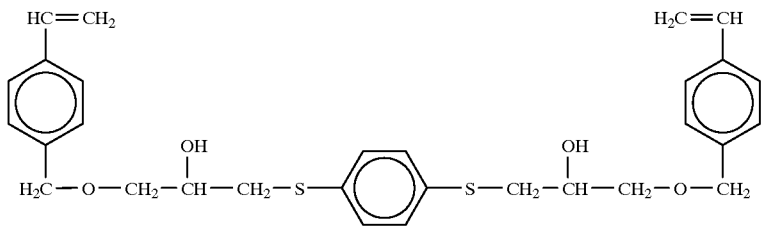

(8-7)

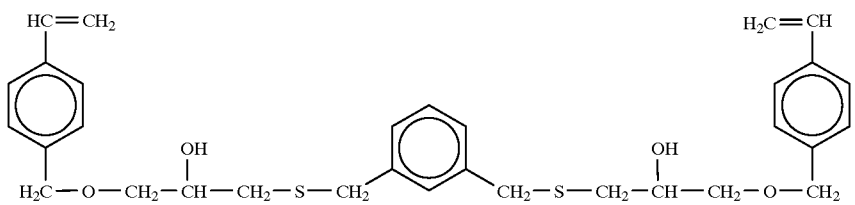

(8-8)

and they are not restrictive.

The above-mentioned compounds having two or more of the reactive unsaturated bond(s) and/or the epoxy group(s) in one molecule may be used singly or in a combination of two or more thereof.

In the present invention, a compound having one or more reactive unsaturated bonds and one or more iso (thio) cyanato groups in one molecule is used as a material, and examples of such a compound include methacrylic acid esters such as methacryloyl isocyanate and 2-isocyanatoethyl methacrylate, acrylic acid esters such as acryloyl isocyanate and 2-isocyanatoethyl acrylate, and styrenes such as m-isopropenyl-α,α'-dimethylbenzyl isocyanate, m-vinyl-α,α'-dimethylbenzyl isocyanate, m-isopropenylbenzyl isocyanate and m-vinylbenzyl isocyanate.

These compounds having the reactive unsaturated group may be used singly or in a combination of two or more thereof.

Furthermore, examples of a compound having one or more epoxy groups and one or more iso(thio)cyanato groups in one molecule include epoxy compounds such as m-2-(1,2-epoxypropyl)-α,α'-dimethylbenzyl isocyanate, m-1,2-epoxy-α,α'-dimethylbenzyl isocyanate, m-2,3-epoxypropyl-α,α'-dimethylbenzyl isocyanate, m-2-(1,2-epoxypropyl) benzyl isocyanate, m-1,2-epoxybenzyl isocyanate and m-2,3-epoxypropylbenzyl isocyanate.

These epoxy compounds may be used singly or in a combination of two or more thereof.

In a certain case, the epoxy compound, when used, may be mixed with the above-mentioned compound having the reactive unsaturated group.

The ratio of the mercapto compound selected from formulae (1), (2) and (3) to the compound having a reactive unsaturated bond(s) and/or b epoxy group(s) and/or c iso (thio)cyanato group(s) in one molecule is such that a functional group molar ratio of (the reactive unsaturated bond+ the epoxy group+the iso(thio)cyanato group)/(the mercapto group) is usually in the range of 0.5 to 20.0.

In the case that the compound having a reactive unsaturated bond(s) and/or b epoxy group(s) and/or c iso(thio) cyanato group(s) in one molecule is a compound having two or more of the reactive unsaturated bond(s) and/or the epoxy group(s) in all in one molecule, the ratio is such that a functional group molar ratio of (the reactive unsaturated bond+the epoxy group)/(the mercapto group) is usually in the range of 0.5 to 10.0.

In addition, for the purpose of further improving impact resistance, a polyiso(thio)cyanate compound can be added to the mercapto compound selected from formulae (1), (2) and (3) regarding the present invention as well as the compound having a reactive unsaturated bond(s) and/or b epoxy group (s) and/or c iso(thio)cyanato group (s) in one molecule. This addition of the polyiso (thio)cyanate compound is particularly effective in the case that the compound having a reactive unsaturated bond(s) and/or b epoxy group(s) and/or c iso(thio)cyanato group(s) in one molecule is a compound having two or more reactive unsaturated bonds in all in one molecule, and examples of the polyiso(thio)cyanate compound which can be used in this case include the following compounds.

The polyisocyanate compound includes, for example, aliphatic polyisocyanates such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis (isocyanatoethyl)carbonate, bis(isocyanatoethyl)ether, 1,4-butyleneglycol-dipropyl-ether-ω,ω'-diisocyanate, lysinediisocyanate methyl ester, lysinetriisocyanate, 2-isocyanatoethyl-2,6-diisocyanatohexanoate, 2-isocyanatopropyl-2,6-diisocyanatohexanoate, xylylene diisocyanate, bis(isocyanatoethyl)benzene, bis-(isocyanatopropyl)benzene, α,α,α',α'-tetramethylxylylene diisocyanate, bis(isocyanatobutyl)benzene, bis (isocyanatomethyl)naphthalene, bis(isocyanatomethyl) diphenyl ether, bis(isocyanatoethyl)phthalate, mesitylene triisocyanate and 2,6-di(isocyanatomethyl)furan;

alicyclic polyisocyanates such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)pentaerythritol, dimeric acid diisocyanate, 2-isocyanatomethyl-3-(3-isocyanatopropyl)-5-isocyanatomethyl-bicyclo[2.2.1]-heptane, 2-isocyanatomethyl-3-(3-isocyanatopropyl)-6- isocyanatomethyl-bicyclo[2.2.1]-heptane, 2-isocyanatomethyl-2-(3-isocyanatopropyl)-5-isocyanatomethyl-bicyclo-[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-3-(3-isocyanatopropyl)-6-(2-isocyanatoethyl)-bicyclo[2.1.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo-[2.2.1]-heptane;

aromatic polyisocyanates such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyldiphenylmethane-3,5,2',4',6'-pentaisocyanate, phenylisocyanatomethyl isocyanate, phenylisocyanatoethyl isocyanate, tetrahydronaphthylene diisocyanate, hexahydrobenzene diisocyanate, hexahydrodiphenylmethane-4,4'-diisocyanate, diphenylether diisocyanate, ethyleneglycoldiphenylether diisocyanate, 1,3-propyleneglycoldiphenylether diisocyanate, benzophenone diisocyanate, diethyleneglycoldiphenylether diisocyanate, dibenzofuran diisocyanate, carbazole diisocyanate, ethylcarbazole diisocyanate and dichlorocarbazole diisocyanate; sulfur-containing aliphatic polyisocyanates such as thiodiethyl diisocyanate, thiodipropyl diisocyanate, thiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate;

aromatic sulfide-type polyisocyanates such as diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide and 4,4'-methoxybenzene-thioethyleneglycol-3,3'-diisocyanate;

aromatic disulfide-type polyisocyanates such as dipenyldisulfide-4,4'-diisocyanate, 2,2'-dimethyldiphenyldisulfide-5,5'-dusocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate;

aromatic sulfone-type polyisocyanates such as diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyldiphenylsulfone-3,3'-diisocyanate, 4,4'-methoxybenzene ethylenedisulfone-3,3'-diisocyanate and 4,4'-dichlorodiphenylsulfone-3,3'-diisocyanate;

sulfonic ester-type polyisocyanates such as 4-methyl-3-isocyanatobenzenesulfonyl-4'-isocyanatophenol ester and 4-methoxy-3-isocyanatobenzenesulfonyl-4'-isocyanatophenol ester;

aromatic sulfonic amide-type polyisocyanates such as 4-methyl-3-isocyanatobenzene-sulfonylanilide-3'-methyl-4'-isocyanate, dibenzenesulfonyl-ethylenediamine-4,4'-diisocyanate, 4,4'-methoxybenzenesulfonylethylenediamine-3,3'-diisocyanate and 4-methyl-3-isocyanatobenzenesulfonylanilide-4-methyl-3'-isocyanate; and sulfur-containing heterocyclic compounds such as thiophene-2,5-diisocyanate, thiophene-2,5-diisocyanatomethyl, 1,4-dithiane-2,5-diisocyanate, 4,5-bis(isocyanatomethyl)-1,3-dithiorane, bis(isocyanatomethyl) tetrahydrothiophene and 2,5-bis(isocyanatomethyl)-1,4-dithiane.

Halogenated derivatives such as chlorinated and brominated derivatives, alkylated derivatives, alkoxylated derivatives, nitrated derivatives, prepolymer type addition products with polyhydric alcohols, carbodiimide modified derivatives, urea modified derivatives, biuret modified derivatives and dimerization or trimerization products of these polyisocyanate compounds may also be used in the present invention.

The polyisothiocyanate compound used as a raw material in the present invention has two or more —NCS groups in the molecule and may also contain sulfur atom or atoms in addition to the isothiocyanate groups.

The polyisothiocyanate compound includes, for example, aliphatic polyisothiocyanates such as 1,2-diisothiocyanatoethane, 1,3-diisothiocyanatopropane, 1,4-diisothiocyanatobutane, 1,6-diisothiocyanatohexane and p-phenylenediisopropylidene diisothiocyanate; alicyclic polyisothiocyanates such as cyclohexane diisothiocyanate; aromatic polyisothiocyanates such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethanediyl)bis(4-isothiocyanatobenzene), 4,4'-diisothiocyanatobenzophenone, 4,4'-diisothiocyanato-3,3'-dimethylbenzophenone, benzanilido-3,4'-diisothiocyanate, diphenylether-4,4'-diisothiocyanate and diphenylamine-4,4'-diisothiocyanate;

heterocyclic polyisothiocyanates such as 2,4,6-triisothiocyanato- 1,3,5-triazine; and carbonyl polyisothiocyanates such as hexanedioyl diisothiocyanate, nonanedioyl diisothiocyanate, carbonic diisothiocyanate, 1,3-benzenedicarbonyl diisothiocyanate, 1,4-benzenedicarbonyl diisothiocyanate and (2,2'-bipyridine)-4,4'-dicarbonyl diisothiocyanate.

The polyisothiocyanate having one or more sulfur atoms in addition to the isothiocyanate groups and two or more functional groups used as a raw material in the present invention includes, for example, sulfur-containing aliphatic polyisothiocyanates such as thiobis(3-isothiocyanatopropane), thiobis(2-isothiocyanatoethane) and dithiobis(2-isothiocyanatoethane);

sulfur-containing aromatic polyisothiocyanates such as 1-isothiocyanato-4-[(2-isothiocyanato)sulfonyl]benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)sulfonyl]-2-methoxybenzene, 4-methyl-3-isothiocyanatobenzenesulfonyl-4'- isothiocyanate phenyl ester and 4-methyl-3-isothiocyanatobenzenesulfonylanilide-3'-methyl-4'-isothiocyanate; and sulfur-containing heterocyclic compounds such as thiophenone-2,5-diisothiocyanate and 1,4-dithiane-2,5-diisothiocyanate.

Further, halogenated derivatives such as chlorinated and brominated derivatives, alkylated derivatives, alkoxylated derivatives, nitrated derivatives, prepolymer type addition products with polyhydric alcohols, carbodiimide modified derivatives, urea modified derivatives, biuret modified derivatives and dimerization and trimerization products of these polyisothiocyanate compounds may also be used in the present invention.

The isocyanato-containing polyisothiocyanate compound used as a raw material in the present invention includes, for example, aliphatic and alicyclic compounds such as 1-isothiocyanato-3-isocyanatopropane, 1-isothiocyanato-5-isocyanatopentane, 1-isothiocyanato-6-isocyanatohexane, isothiocyanatocarbonyl isocyanate and 1-isothiocyanato-4-isocyanatocylohexane;

aromatic compounds such as 1-isothiocyanato-4-isocyanatobenzene and 4-methyl-3-isothiocyanato-1-isocyanatobenzene;

heterocyclic compounds such as 2-isocyanato-4,5-diisothiocyanato-1,3,5-triazine; and compounds having sulfur atoms in addition to isothiocyanate groups such as 4-isocyanato-4'-isothiocyanatodiphenyl sulfide and 2-isocyanato-2'-isothiocyanatodiethyl disulfide.

Further, halogenated derivatives such as chlorinated and brominated derivatives, alkylated derivatives, alkoxylated derivatives, nitrated derivatives, prepolymer type addition products with polyhydric alcohols, carbodiimide modified derivatives, urea modified derivatives, biuret modified derivatives and dimerization or trimerization products of these compounds may also be used in the present invention.

These isocyanates may be used singly or as a mixture of two or more of them.

Among these compounds, tolylene diisocyanate, 4,4'-diphenylmethane diisocyanate, xylylene diisocyanate, naphthalene diisocyanate, α,α,α',α'-tetramethylxylylene diisocyanate, hexamethylene diisocyanate, dicyclohexylmethane diisocyanate, isophorone diisocyanate and bis(isocyanatomethyl)cyclohexane are preferable from the viewpoints of cost and easy availability. When xylylene diisocyanate or α,α,α',α'-tetramethylxylylene diisocyanate is used, a lens having a high refractive index and low yellowing properties can be particularly preferably obtained.

Furthermore, for the purpose of improving the resin in compliance with its use purpose, a compound having an active hydrogen group such as another thiol group or a hydroxyl group may be used together with the mercapto compound selected from formulae (1), (2) and (3) regarding the present invention. This employment of the active hydrogen group is particularly effective in the case that the compound having a reactive unsaturated bond(s) and/or b epoxy group(s) and/or c iso(thio)cyanato group(s) in one molecule is a compound having two or more reactive unsaturated groups. Examples of the compound having an active hydrogen group such as the thiol group or the hydroxyl group which can be used together with the mercapto compound selected from formulae (1), (2) and (3) regarding the present invention include the following compounds:

aliphatic polythiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 3,6-dioxaoctane-1,8-dimercaptan, 2-methylcyclohexane-2,3-dithiol, bicyclo[2.2.1]hepta-exo-cis-2,3-dithiol, 1,1-bis(mercaptomethyl)cyclohexane, thiomalic acid bis(2-mercaptoethyl ester), 2,3-dimercaptosuccinic acid bis(2-mercaptoethyl ester), 2,3-dimercapto-1-propanol (3-mercaptoacetate), diethyleneglycol bis(2-mercaptoacetate), diethyleneglycol bis(3-mercaptopropionate), 1,2-dimercaptopropylmethylether, 2,3-dimercaptopropylmethylether, 2,2-bis(mercaptomethyl)-1,3-propanedithiol, bis(2-mercaptoethyl)ether, ethyleneglycol bis(2-mercaptoacetate), ethyleneglycol bis(3-mercaptopropionate), trimethylolpropanetris(2-mercaptoacetate), trimethylolpropanetris(3-mercaptopropionate), pentaerythritoltetrakis(2-mercaptoacetate), pentaerythritoltetrakis(3-mercaptopropionate), 1-(1'-mercaptoethylthio)-2,3-dimercaptopropane, 1-(2'-mercaptopropylthio)-2,3-dimercaptopropane, 1-(3'-mercaptopropylthio)-2,3-dimercaptopropane, 1-(4'-mercaptobutylthio)-2,3-dimercaptopropane, 1-(5'-mercaptopentylthio)-2,3-dimercaptopropane, 1-(6'-mercaptohexylthio)-2,3-dimercaptopropane, 1,2-bis(1'-mercaptomethylthio)-3-mercaptopropane, 1,2-bis(2'-mercaptoethylthio)-3-mercaptopropane, 1,2-bis(3'-mercaptopropylthio)-3-mercaptopropane, 1,2-bis(4'-mercaptobutylthio)-3-mercaptopropane, 1,2-bis(5'-mercaptopentylthio)-3-mercaptopropane, 1,2-bis(6'-mercaptohexylthio)-3-mercaptopropane, 1,2,3-tris(1'-mercaptomethylthio)propane, 1,2,3-tris(2'-mercaptoethylthio)propane, 1,2,3-tris(3'-mercaptopropylthio)propane, 1,2,3-tris(4'-mercaptobutylthio)propane, 1,2,3-tris(5'-mercaptopentylthio)-propane and 1,2,3-tris(6'-mercaptohexylthio)propane;

aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyloxy)benzene, 1,3-bis(mercaptomethyloxy)benzene, 1,4-bis(mercaptomethyloxy)-benzene, 1,2-bis(mercaptoethyloxy)benzene, 1,3-bis(mercaptoethyloxy)benzene, 1,4-bis(mercaptoethyloxy)benzene, 1,2,3-trimercaptobenzene, 1,2,4-trimercaptobenzene, 1,2,5-trimercaptobenzene, 1,2,3-tris(mercaptomethyl)-benzene, 1,2,4-tris(mercaptomethyl)benzene, 1,2,5-tris-(mercaptomethyl)benzene, 1,2,3-tris(mercaptoethyl)benzene, 1,2,4-tris(mercaptoethyl)benzene, 1,2,5-tris(mercaptoethyl)benzene, 1,2,3-tris(mercaptomethyloxy)benzene, 1,2,4-tris(mercaptomethyloxy)benzene, 1,2,5-tris(mercaptomethyloxy)benzene, 1,2,3-tris(mercaptoethyloxy)benzene, 1,2,4-tris(mercaptoethyloxy)benzene, 1,2,5-tris(mercaptoethyloxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis-(mercaptomethyl)benzene, 1,2,4,5-tetrakis(mercaptomethyl)-benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyloxy)benzene, 1,2,3,5-tetrakis(mercaptomethyloxy)benzene, 1,2,4,5-tetrakis(mercaptomethyloxy)benzene, 1,2,3,4-tetrakis(mercaptoethyloxy)benzene, 1,2,3,5-tetrakis (mercaptoethyloxy)benzene, 1,2,4,5-tetrakis (mercaptoethyloxy)benzene, 2,2'-dimercaptobiphenyl, 4,4'-dimercaptobiphenyl, 4,4'-dimercaptodibenzyl, 2,5-toluenedithiol, 3,4-toluenedithiol, 1,4-naphthalenedithiol, 1,5-naphthalenedithiol 2,6-naphthalenedithiol, 2,7-naphthalenedithiol, 2,4-dimethylbenzene-1,3-dithiol, 4,5-dimthylbenzene-1,3-dithiol, 9,10-anthracenedimethanethiol, 1,3-di(4'-methoxyphenyl)propane-2,2-dithiol, 1,3-diphenylpropane-2,2-dithiol, phenylmethane-1,1-dithiol and 2,4-di(4'-mercaptophenyl)pentane;

halogen-substituted aromatic polythiols including chlorine- or bromine-substituted derivative such as 2,5-dichlorobenzene-1,3-dithiol, 1,3-di(4'-chlorophenyl)propane-2,2-dithiol, 3,4,5-tribromo-1,2-dimercaptobenzene, and 2,3,4,6-tetrachloro-1,5-bis(mercaptomethyl)benezene;

polythiols containing heterocyclic rings such as 2-methylamino-4,6-dithiol-sym-triazine, 2-ethylamino-4,6-dithiolsym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine and 2-thiobutyloxy-4,6-dithiol-sym-triazine;

aromatic polythiols having sulfur atoms in addition to mercapto groups such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)-benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis-(mercaptoethylthio)benzene and aromatic ring alkylated derivatives of these polythiols;

aliphatic polythiols having sulfur atoms in addition to mercapto groups such as bis(mercaptomethyl) sulfide, bis(mercaptoethyl) sulfide, bis(mercaptopropyl) sulfide, bis(mercaptomethylthio)methane, bis(2-mercaptoethylthio)-methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)-propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithiane, bis(mercaptomethyl) disulfide, bis(mercaptoethyl) disulfide and bis(mercaptopropyl) disulfide, esters of thioglycolic acid and mercaptopropionic acid with these compounds, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(2-mercaptoacetate), 1,4-dithiane-2,5-diol bis(3-mercaptopropionate), thioglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester) and dithiodipropionic acid bis(2,3-dimercaptopropyl ester);

and heterocyclic compounds having sulfur atoms in addition to mercapto groups such as 3,4-thiophenedithiol, 2,5-bis(mercaptomethyl)tetrahydrothiophene, bis(mercaptomethyl)-1,3-dithiolane, 2,5-dimercapto-1,3,4-thiadiazole, 2,5-dimercapto-1,4-dithane and 2,5-dimercaptomethyl-1,4-dithiane.

Hydroxy-containing polythiol compounds include mercaptodiols such as thioglycerol, 2,3-dihydroxy-1-mercaptobutane, 2,3-dihydroxy-1-mercaptopentane, 3,4-dihydroxy-1-mercaptobutane, 3,4-dihydroxy-1-mercaptopentane and 3,4-dihydroxy-1-mercaptohexane; and dimercaptoalcohols such as 2-hydroxy-1,3-dimercaptopropane, 1-hydroxy-2,3-dimercaptopropane, 2-hydroxy-1,3-dimercaptobutane, 2-hydroxy-1,3-dimercaptopentane, 2-hydroxy-1,3-dimercaptohexane, 3-hydroxy-1,4-dimercaptobutane, 3-hydroxy-1,4-dimercaptopentane and 3-hydroxy-1,4-dimercaptohexane.

In the case that the compound having an active hydrogen group such as the other thiol group or the hydroxyl group is used together with the polyiso(thio)cyanate compound and the mercapto compound selected from formulae (1), (2) and (3) regarding the present invention, the ratio of the compound having the active hydrogen group which can be altered by a combination of these compounds can be suitably selected and decided in consideration of desired physical properties and chemical properties of the resin. In the case that the compound having a reactive unsaturated bond(s) and/or b epoxy group(s) and/or c iso(thio)cyanato group(s) in one molecule is a compound having two or more reactive unsaturated groups, the amount of the compound having two or more reactive unsaturated groups is in the range of 10 to 70% by weight, preferably 10 to 50% by weight based on the total weight, and in other words, the ratio of the compound having two or more reactive unsaturated groups is in the range of 0.5 to 20.0, preferably 0.5 to 10.0, more preferably 1.0 to 3.0 in terms of a functional group molar ratio of (the iso(thio)cyanato group+the reactive unsaturated bond)/(the mercapto group+the hydroxyl group).

The resin of the present invention can be obtained by applying heat, visible light or ultraviolet light to a monomer mixture, but in order to carry out polymerization in a short period of time or to obtain the resin lens having excellent scratch resistance, the ultraviolet light is utilized for the polymerization. In this case, a heat polymerization initiator or a photopolymerization initiator may be used.

In the case that the heat polymerization is carried out, a conventional radical polymerization initiator can be used as the polymerization initiator, and examples of the usable polymerization initiator include benzoyl peroxide, diisopropylperoxy dicarbonate, azobisisobutyronitrile, azodicyclohexanecarbonitrile, tert-butylperoxy-2-ethyl hexanoate, azobismethylvaleronitrile and mixtures thereof.

In the case that the polymerization is done by ultraviolet light curing, a conventional light sensitizer can be used as the polymerization initiator, and examples of the usable light sensitizer include benzoyl, benzoyl methyl ether, benzoyl propyl ether, benzoyl isobutyl ether, 2-hydroxy-2-benzoylpropane and diphenyl disulfide.

In addition, there may be used an amine which has usually been used as an epoxy curing agent. Moreover, there can be suitably added a known reaction catalyst which has been used in the formation of a polyurethane bond between the iso(thio)cyanato group and the mercapto group. This kind of polymerization initiator can usually be used in an amount of about 10% by weight as an upper limit based on the monomer mixture.

The polysulfide resin regarding the present invention can usually be obtained by cast polymerization.

Concretely, there are mixed the mercapto compound selected from formulae (1), (2) and (3), the compound having a reactive unsaturated bond(s) and/or b epoxy group (s) and/or c iso(thio)cyanato group(s) in one molecule (however, a+b+c≧2, and a and b are not simultaneously 0), and if necessary, a reaction catalyst, UV-absorber and releasing agent. Next, the thus mixed solution is degassed in a suitable manner as needed, cast into a mold, and then polymerized while slowly heated usually from a low temperature of about 0 to 5° C. to a high temperature of about 100 to 180° C. Alternatively, the polymerization may be done by the ultraviolet light or the visible light. This photopolymerization can be carried out by light from a light source such as a high pressure mercury arc lamp, a halogen lamp, a xenon lamp, a tungsten lamp, a fluorescent lamp or sunlight, as in the case of a conventional photopolymerizable material. At this time, the polymerization initiator can be used as needed, but no particular restriction is put on the kind of polymerization initiator, and there can be used a known radical generator or a light sensitizer which can generate radicals when irradiated with light. The polymerization can be carried out by one or a combination of the photopolymerization and the heat polymerization.

In this case, in order to facilitate mold release after the polymerization, a known release treatment may be applied to a mold.

Furthermore, the lens made from the polysulfide resin regarding the present invention can be subjected to a physical or a chemical treatment such as surface polishing, an antistatic treatment, a hard coat treatment, a reflective coat treatment, a dyeing treatment or a dimming treatment as needed in order to improve the prevention of reflection, the impartment of a high hardness, wear resistance, chemical resistance, fog resistance, the impartment of fashionability, and the like.

Next, the present invention will be described in detail with reference to examples and comparative examples. In this connection, among the performances of obtained lenses, a refractive index, an Abbe number, heat resistance and dyeability were evaluated in accordance with the following test procedures.

Refractive index and Abbe number: Each of the refractive index and the Abbe number was measured at 20° C. by the use of a Pulfrich refractometer.

Heat resistance: A sample lens was heated at 100° C. for 1 hour in an oven, and load was then applied to both the ends of the lens. At this time, when scarcely deformed, the sample was ranked as "A", and when slightly deformed, it was ranked as "B", and when largely deformed, it was ranked as "C".

Dyeability: A sample lens having a thickness of 1.0 mm was immersed for 5 minutes in a dye bath at 90° C. comprising each of 5 g/liter aqueous solutions of ML-Yellow, ML-Red and ML-Blue which were disperse dyes for plastic lenses made by Mitsui Toatsu Dye Co., Ltd., and the dyeability of each lens was then visibly observed.

Dyeing heat resistance: A sample lens having a thickness of 1.0 mm was immersed in a dye bath at 90° C. for 5 minutes, and it was then visibly observed whether or not the lens was deformed.

Impact resistance: A lens having a central thickness of 1 mm was tested in accordance with a FDA standard. At this time, when not broken, the lens was ranked as "A", and when cracked but not pierced, it was ranked as "B", and when pierced to form a hole, it was ranked as "C".

Scratch resistance: As a practical scratch resistance test, the surface of a lens was rubbed with a steel wool of #000. At this time, when scarcely scratched as in the case of a DAC lens, the lens was ranked as "A", and when scarcely scratched as in the case of Spectraligh™, it was ranked as "B", and when easily scratched than in the case of Spectraligh™, it was ranked as "C".

In the following Examples and Comparative Examples, the term "part" or "parts" means "part by weight" or "parts by weight" and "%" means "weight percent".

EXAMPLE 1

A mixture consisting of a monomer mixture of 20.1 parts of 2-(3,4-epoxycyclohexyl-5,5-spiro-3,4-epoxy)-cyclohexanemethadioxane (hereinafter abbreviated as "SEP") and 13.8 parts of 4,8-bis(mercaptomethyl)-3,6,9-trithia-1,11-undecadithiol (represented by the below-described formula, hereinafter abbreviated as "FSH"), 1.5% (based on the total weight of the monomer mixture) of triethylenediamine (hereinafter abbreviated as "TEDA") as a curing catalyst, and 2.0% (based on the total weight of the monomer mixture) of Zelec UN™ (manufactured by Du Pont) as an internal mold releasing agent was stirred and degasified at room temperature under reduced pressure for 1 hour. The mixture was then charged into a mold, where the mixture was cured by heating at 70–120° C. for 20 hours.

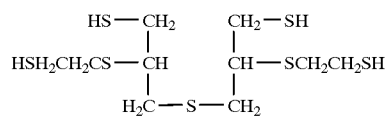

EXAMPLE 2

21.3 parts of glycidylmethacrylate (hereinafter abbreviated as "GMA") and 17.8 parts of FSH were mixed. To the mixture, 1.0% (based on the total weight of the mixture) of 2-hydroxy-2-methyl-1-phenylpropane-1-one (hereinafter abbreviated as "EMPO") as a catalyst and 0.2% (based on the total weight of the mixture) of TEDA were added and the resulting mixture was stirred and degasified at room teperature under reduced pressure. The mixture was then charged into a mold, where the mixture was cured by heating at 120° C. for 1 hour after irradiating with UV light for 1 hour.

EXAMPLE 3

To a mixture of 18.8 parts of FSH and 41.2 parts of divinylbenzene (hereinafter abbreviated as "DVB"), 0.1%

(based on the total weight of the monomer mixture) of diphenyl(2,4,6-trimethylbenzoyl)phosphineoxide (hereinafter abbreviated as "PBPO") were added as a catalyst and the resulting mixture was stirred and degasified at room temperature under reduced pressure. The mixture was then charged into a mold, where the mixture was cured by irradiating with light from fluorescent lamp for 2 hours and UV light for 1 hour.

EXAMPLE 4

To a mixture of 19.7 parts of FSH and 40.3 parts of DVB, 0.1% (based on the total weight of the monomer mixture) of PBPO were added as a catalyst and the resulting mixture was stirred and degasified at room temperature under reduced pressure. The mixture was then charged into a mold, where the mixture was cured by irradiating with light from fluorescent lamp for 2 hours and UV light for 1 hour.

and degasified at room temperature under reduced pressure. The mixture was then charged into a mold, where the mixture was cured by irradiating with light from fluorescent lamp for 2 hours and UV light for 1 hour.

COMPARATIVE EXAMPLE 3

To a monomer mixture of 18.0 parts of GST and 42.0 parts of DVB, 0.1% (based on the total weight of the monomer mixture) of PBPO was added as a catalyst. The resulting mixture was stirred and degasified at room temperature under reduced pressure. The mixture was then charged into a mold, where the mixture was cured by irradiating with light from fluorescent lamp for 2 hours and UV light for 1 hour.

COMPARATIVE EXAMPLE 4

A lens was molded in the same manner as in Comparative Example 3 by using a combination of monomers described in Table 1.

The properties of the lenses thus obtained are given in Table 1.

TABLE 1

| | Monomer composition (part by weight) | Refractive index ($n_d$) | Abbe number ($v_d$) | Heat resistance | Impact resistance | Scratch resistance |
|---|---|---|---|---|---|---|
| Example 1 | SEP(40.2)/FSH(27.6) | 1.594 | 46 | A | A | A |
| Example 2 | GMA(21.3)/FSH(17.8) | 1.600 | 43 | A | A | A |
| Example 3 | DVB(41.2)/FSH(18.8) | 1.642 | 32 | A | A | A |
| Example 4 | DVB(40.3)/FSH(19.7) | 1.643 | 32 | A | A | A |
| Example 5 | BPEA(38.9)/DVB(9.9)/FSH(11.1) | 1.590 | 38 | A | A | A |
| Comp. Ex 1 | SEP(36.8)/GST(24.0) | 1.595 | 46 | B | B | B |
| Comp. Ex 2 | DVB(36.0)/PEMP(24.0) | 1.604 | 32 | C | B | B |
| Comp. Ex 3 | DVB(42.0)/GST(18.0) | 1.638 | 32 | B | B | B |
| Comp. Ex 4 | DVB(13.0)/GST(18.0) | 1.670 | 32 | B | B | B |

EXAMPLE 5

To a mixture of 38.9 parts of 2,2-bis[4-(acryloxydiethoxy)phenyl]propane (hereinafter abbreviated as "BPEA"), 9.9 parts of DVB and 11.1 parts of FSH, 1.0% (based on the total weight of the monomer mixture) of 2-benzoyl-2-propanol and 2.0% of tert-butyl-peroxy(2-ethylhexanoate) were added as catalysts. The resulting mixture was stirred and degasified at room temperature under reduced pressure. The mixture was then charged into a mold, where the mixture was cured by heating at 120° C. for 1 hour after irradiating with UV light for 10 minutes.

COMPARATIVE EXAMPLE 1

To a monomer mixture of 20.1 parts of SEP and 13.8 parts of 1,2-bis(2-mercaptoethylthio)-3-mercaptopropane (hereinafter abbreviated as "GST"), 1.5% (based on the total weight of the monomer mixture) of TEDA as a curing catalyst and 1.0% (based on the total weight of the monomer mixture) of Zelec UN™ (manufactured by Du Pont) as an internal mold releasing agent were added. The resulting mixture was stirred and degasified at room temperature under reduced pressure for 1 hour. The mixture was charged into a mold, where the mixture was cured by heating at 70–120° C. for 20 hours.

COMPARATIVE EXAMPLE 2

To a monomer mixture of 24.0 parts of pentaerythritoltetrakis(3-mercaptopropionate) (hereinafter abbreviated as "PEMP") and 36.0 parts of DVB, 0.1% (based on the total weight of the monomer mixture) of PBPO was added as a catalyst. The resulting mixture was stirred

EXAMPLE 6

Mixed into a homogeneous solution were 47.7 parts of FSH, 52.3 parts of m-isopropenyl-α,α'-dimethylbenzylisocyanate, 0.05 part of triethylenediamine, 0.1 part of dibutyltin dichloride and, 1 part of Perbutyl O™ (product of NIPPON OIL & FATS CO., LTD.), followed by degasification. The solution was injected into a mold composed of glass mold and gasket and subjected to release treatment. The mold was then gradually heated from 30° C. to 120° C., at which the solution was heated and cured for 24 hours. After completion of the polymerization, the mold was cooled and the resulting lens was taken out of the mold.

The lens so obtained was colorless and transparent. Optical strain or striae was not observed practically. The lens had a refractive index ($n_d$) of 1.620 and an Abbe number ($v_d$) of 37.

When the lens was dyed in a dye bath at 90° C., the dyeability was good and no deformation was observed. The evaluation of impact resistance was "A" and the evaluation of scratch resistance was also "A".

EXAMPLE 7

Mixed into a homogeneous solution were 62.3 parts of FSH, 37.7 parts of methacryloylisocyanate, 0.1 part of dibutyltin dichloride and 1 part of Perbutyl O™ (product of NIPPON OIL & FATS CO., LTD.), followed by degasification. The solution was injected into a mold composed of glass mold and gasket and subjected to release treatment. The mold was then gradually heated from 30° C. to 120° C., at which the solution was heated and cured for 24 hours. After completion of the polymerization, the mold was cooled and the resulting lens was taken out of the mold.

The lens so obtained was colorless and transparent. Optical strain or striae was not observed practically. The lens had a refractive index ($n_d$) of 1.640 and an Abbe number ($v_d$) of 36.

When the lens was dyed in a dye bath at 90° C., the dyeability was good and no deformation was observed. The evaluation of impact resistance was "A" and the evaluation of scratch resistance was also "A".

EXAMPLE 8

Mixed into a homogeneous solution were 45.8 parts of FSH, 54.2 parts of m-2-(1,2-epoxypropyl)-α,α'-dimethylbenzylisocyanate, 0.05 part of triethylenediamine, 0.1 part of dibutyltin dichloride and, 1 part of Perbutyl O™ (product of NIPPON OIL & FATS CO., LTD.), followed by degasification. The solution was injected into a mold composed of glass mold and gasket and subjected to release treatment. The mold was then gradually heated from 30° C. to 120° C., at which the solution was heated and cured for 24 hours. After completion of the polymerization, the mold was cooled and the resulting lens was taken out of the mold.

The lens so obtained was colorless and transparent. Optical strain or striae was not observed practically. The lens had a refractive index ($n_d$) of 1.622 and an Abbe number ($v_d$) of 36.

When the lens was dyed in a dye bath at 90° C., the dyeability was good and no deformation was observed. The evaluation of impact resistance was "A" and the evaluation of scratch resistance was also "A".

EXAMPLE 9

Mixed into a homogeneous solution were 47.7 parts of FSH, 52.3 parts of m-isopropenyl-α,α'-dimethylbenzylisocyanate, 0.05 part of triethylenediamine, 0.1 part of dibutyltin dichloride and, 1 part of EMPO, followed by degasification. The solution was injected into a mold composed of glass mold and gasket and subjected to release treatment. The solution was cured by irradiating with a light from high pressure mercury lamp for 15 minutes and heating in an oven at 120° C. for 2 hours. After completion of the polymerization, the mold was cooled and the resulting lens was taken out of the mold.

The lens so obtained was colorless and transparent. Optical strain or striae was not observed practically. The lens had a refractive index ($n_d$) of 1.620 and an Abbe number ($v_d$) of 37.

When the lens was dyed in a dye bath at 90° C., the dyeability was good and no deformation was observed. The evaluation of impact resistance was "A" and the evaluation of scratch resistance was also "A".

COMPARATIVE EXAMPLE 5

Mixed into a homogeneous solution were 25 parts of triallylisocyanurate, 25 parts of 1,2-bis(2-mercaptoethylthio)-3-mercaptopropane and 0.5 part of azobisisobutyronitrile, followed by enough degasification. The solution was injected into a mold composed of glass mold and gasket and subjected to release treatment. The mold was then gradually heated from 30° C. to 120° C., at which the solution was heated and cured for 24 hours. After completion of the polymerization, the mold was cooled and the resulting lens was taken out of the mold.

The lens so obtained was colorless and transparent. Optical strain or striae was not observed practically. The lens had a refractive index ($n_d$) of 1.630 and an Abbe number ($v_d$) of 40.

When the lens was dyed in a dye bath at 90° C., the dyeability was good, but deformation was observed. The evaluation of impact resistance was "B" and the evaluation of scratch resistance was also "B".

EXAMPLE 10

100 g of 2,5-bis(acryloyloxyethylthiomethyl)-1,4-dithiane (referred as "4-1" in Table 2) and 44.9 g of FSH were mixed and then degasified for 1 hour under reduced pressure. The resulting mixture was then charged into a mold, where the mixture was cured by heating at 120° C. for 1 hour after irradiating with UV light for 10 minutes. The results of evaluation for thus obtained lens are shown in Table 2.

EXAMPLES 11–34

Lenses were molded by the same manner as in Example 10 except for using monomer combinations of Table 2. The results are shown in Table 2 with the result of Example 10.

COMPARATIVE EXAMPLE 6

41.7 g of GST and 45.2 g of xylylenediisocyanate (hereinafter abbreviated as "XDi") were mixed and the mixture was degasified for 1 hour under reduced pressure. The resulting mixture was charged into a mold and then cured by heating at 20–120° C. for 12 hours. Thus obtained lens had a refractive index ($n_d$) of 1.66 and an Abbe number ($v_d$) of 32. That is, the lens was inferior in balance of refractive index and Abbe number. Moreover, the lens had inadequate heat resistance. The evaluation of impact resistance was "A", but the evaluation of scratch resistance was "C".

COMPARATIVE EXAMPLE 7

The unsaturated compound (4-1) used in Example 10 was polymerized alone. Thus obtained lens had a refractive index ($n_d$) of 1.62 and an Abbe number ($v_d$) of 40 and was inferior in optical properties to that of Example 1. Moreover, a lens having 1 mm of central thickness did not success in a test based on FDA standard and the evaluation of impact resistance was "C".

COMPARATIVE EXAMPLE 8

100 g of the unsaturated compound (4-1) used in Example 10, 42.6 g of GST and 0.5 g of azobisisobutyronitrile were mixed and degasified for 1 hour under reduced pressure. The resulting mixture was charged into a mold and then cured by irradiating with UV light for 10 minutes and heating at 120° C. for 1 hour.

The obtained lens had a refractive index ($n_d$) of 1.66 and an Abbe number ($v_d$) of 40. The lens had insufficient heat resistance. The evaluations of impact and scratch resistances were both "B".

TABLE 2

| Example | Polythiol (g) | Unsaturated compound (g) | Modifier (g) | $n_d$ | $v_d$ | 1) | 2) | 3) |
|---|---|---|---|---|---|---|---|---|
| 10 | FSH(45) | 4-1(100) | | 1.66 | 40 | A | A | A |
| 11 | FSH(42) | 4-2(100) | | 1.65 | 41 | A | A | A |
| 12 | FSH(42) | 4-3(100) | | 1.65 | 42 | A | A | A |
| 13 | FSH(39) | 4-4(100) | | 1.64 | 43 | A | A | A |
| 14 | FSH(57) | 5-1(100) | | 1.68 | 39 | A | A | A |

TABLE 2-continued

| Example | Polythiol (g) | Unsaturated compound (g) | Modifier (g) | $n_d$ | $v_d$ | 1) | 2) | 3) |
|---|---|---|---|---|---|---|---|---|
| 15 | FSH(53) | 5-2(100) | | 1.67 | 39 | A | A | A |
| 16 | FSH(39) | 5-4(100) | | 1.67 | 40 | A | A | A |
| 17 | FSH(64) | 5-6(100) | | 1.70 | 38 | A | A | A |
| 18 | FSH(49) | 5-7(100) | | 1.64 | 42 | A | A | A |
| 19 | FSH(69) | 6-1(100) | | 1.70 | 37 | A | A | A |
| 20 | FSH(52) | 7-1(100) | | 1.70 | 35 | A | A | A |
| 21 | FSH(48) | 7-2(100) | | 1.67 | 36 | A | A | A |
| 22 | FSH(36) | 8-1(100) | | 1.63 | 38 | A | A | A |
| 23 | FSH(31) | 8-3(100) | | 1.68 | 33 | A | A | A |
| 24 | FSH(32) | 8-4(100) | | 1.68 | 33 | A | A | A |
| 25 | FSH(30) | 8-5(100) | | 1.69 | 32 | A | A | A |
| 26 | FSH(35) | 8-7(100) | | 1.67 | 33 | A | A | A |
| 27 | FSH(33) | 8-8(100) | | 1.66 | 35 | A | A | A |
| 28 | FSH(45) | 4-1(100) | | 1.63 | 40 | A | A | A |
| 29 | FSH(57) | 5-1(50) | XDi(29) | 1.67 | 36 | A | A | A |
| 30 | FSH(40) | 5-1(100) | BMEDT (20) | 1.67 | 39 | A | A | A |
| 31 | FSH(51) | 4-1(50) 5-1(50) | | 1.67 | 40 | A | A | A |
| 32 | FSH(40) | 5-1(100) | GST(16) | 1.67 | 39 | A | A | A |
| 33 | FSH(57) | 5-1(100) | EGDMA (20) | 1.66 | 41 | A | A | A |
| 34 | FSH(84) | 5-1(100) | GECH(20) | 1.67 | 40 | A | A | A |

1) Heat resistance
2) Impact resistance
3) Scratch resistance

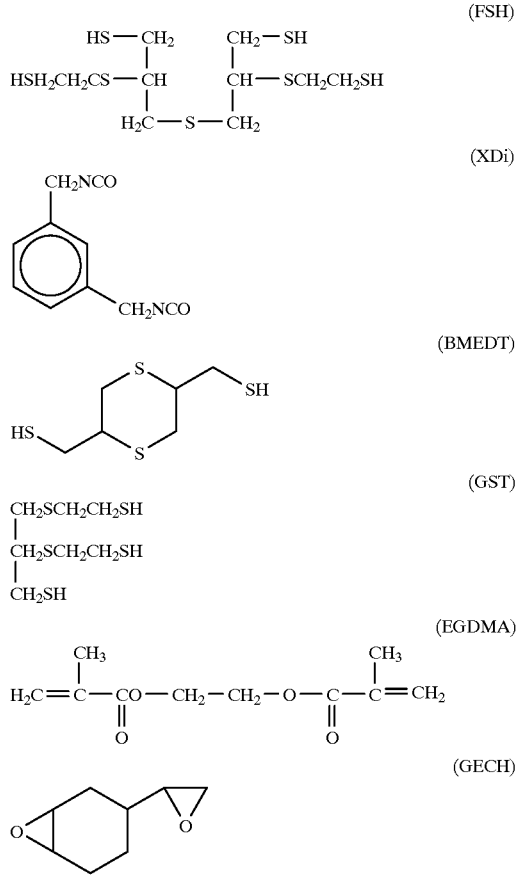

(FSH), (XDi), (BMEDT), (GST), (EGDMA), (GECH)

EXAMPLE 35

Mixed into a homogeneous solution were 31.3 parts of isophoronediisocyanate (hereinafter abbreviated as "IPDI"), 38.7 parts of FSH, 30.0 parts of ethyleneglycol dimethacrylate (hereinafter abbreviated as "EGDMA") and 0.02 wt. % (based on the total amount of the mixture) of dibutyl tin dichloride, followed by degasification. In a dark room, 0.5 part of Dalocure™ 1173 (a product of CIBA-GEIGI AG) was added thereto and the solution was further stirred. The solution was injected into a mold composed of glass mold and gasket and subjected to release treatment. The solution was then irradiated to a light from high pressure mercury lamp for 15 minutes and heated in an oven at 120° C. for 2 hours to cure the solution. After completion of the polymerization, the mold was cooled and the resulting lens was taken out of the mold.

The lens so obtained was colorless and transparent. Optical strain or striae was not observed practically. The lens had a refractive index ($n_d$) of 1.580 and an Abbe number ($v_d$) of 41.

When the lens was dyed in a dye bath at 90° C., the dyeability was good and no deformation was observed. When the lens was rubbed with steel wool, the lens was not scratched and therefore, the evaluation of scratch resistance was "A". The lens was not broken even 114 g in iron ball dropping test and therefore, the evaluation of impact resistance was also "A".

EXAMPLE 36

A lens was made by the same procedures as in Example 35 except that 34.2 parts of dicyclohexylmethane-4,4'-diisocyanate (hereinafter abbreviated as "HMDI"), 35.8 parts of FSH, 30.0 parts of EGDMA, 0.02 wt. % of dibutyl tin dichloride and 0.5 part of Dalocure™ 1173 were used.

The lens so obtained was colorless and transparent. Optical strain or striae was not observed practically. The lens had a refractive index ($n_d$) of 1.579 and an Abbe number ($v_d$) of 41.

When the lens was dyed in a dye bath at 90° C., the dyeability was good and no deformation was observed. When the lens was rubbed with steel wool, the lens was not scratched and therefore, the evaluation of scratch resistance was "A". The lens was not brocken even 114 g in iron ball dropping test and therefore, the evaluation of impact resistance was also "A".

EXAMPLE 37

A lens was made by the same procedures as in Example 35 except that 29.0 parts of 1,3-bis(isocyanatomethyl)cyclohexane (hereinafter abbreviated as "HXDI"), 41.0 parts of FSH, 30.0 parts of EGDMA, 0.02 wt. % of dibutyl tin dichloride and 0.5 part of Dalocure™ 1173 were used.

The lens so obtained was colorless and transparent. Optical strain or striae was not observed practically. The lens had a refractive index ($n_d$) of 1.582 and an Abbe number ($v_d$) of 37.

When the lens was dyed in a dye bath at 90° C., the dyeability was good and no deformation was observed. When the lens was rubbed with steel wool, the lens was not scratched and therefore, the evaluation of scratch resistance was "A". The lens was not broken even 114 g in iron ball dropping test and therefore, the evaluation of impact resistance was also "A".

EXAMPLE 38

A lens was made by the same procedures as in Example 35 except that 28.4 parts of m-xylylenediisocyanate (hereinafter abbreviated as "XDI"), 41.6 parts of FSH, 30.0 parts of EGDMA, 0.02 wt. % of dibutyl tin dichloride and 0.5 part of Dalocure™ 1173 were used.

The lens so obtained was colorless and transparent. Optical strain or striae was not observed practically. The lens had a refractive index ($n_d$) of 1.616 and an Abbe's number ($v_d$) of 35.

When the lens was dyed in a dye bath at 90° C., the dyeability was good and no deformation was observed. When the lens was rubbed with steel wool, the lens was not scratched and therefore, the evaluation of scratch resistance was "A". The lens was not broken even 114 g in iron ball dropping test and therefore, the evaluation of impact resistance was also "A".

EXAMPLE 39

A lens was made by the same procedures as in Example 35 except that 12.3 parts of XDI, 17.8 parts o IPDI, 39.9 parts of FSH, 30.0 parts of trimethylolpropane trimethacrylate (hereinafter abbreviated as "TMPTMA"), 0.02 wt. % of dibutyl tin dichloride and 0.5 part of Dalocure™ 1173 were used.

The lens so obtained was colorless and transparent. Optical strain or striae was not observed practically. The lens had a refractive index ($n_d$) of 1.594 and an Abbe's number ($v_d$) of 41.

When the lens was dyed in a dye bath at 90° C., the dyeability was good and no deformation was observed. When the lens was rubbed with steel wool, the lens was not scratched and therefore, the evaluation of scratch resistance was "A". The lens was not broken even 114 g in iron ball dropping test and therefore, the evaluation of impact resistance was also "A".

EXAMPLES 40–54

Each lens was made by the same procedures as in Example 35 except for each monomer composition in Table 3 was used. The obtained lens was evaluated in optical properties, dyeability, heat resistance and impact resistance. The results are shown in Table 3.

COMPARATIVE EXAMPLE 9

A lens was made by the same procedures as in Example 1 except that 52.0 parts of XDi, 48.0 parts of GST and 0.02 wt. % of butyl tin dichloride were used. In this case, it is necessary to rise a temperature from 20° C. to 120° C. for 10 hours to obtain the lens having no optical strain or striae.

The lens so obtained was colorless and transparent. Optical strain or striae was not observed practically. The lens had a refractive index ($n_d$) of 1.660 and an Abbe number ($v_d$) of 33.

When the lens was dyed in a dye bath at 90° C., the dyeability was good, but deformation was observed. The lens was not broken even 114 g in iron ball dropping test and therefore, the evaluation of impact resistance was also "A". When the lens was rubbed with steel wool, the lens was greatly scratched and therefore, the evaluation of scratch resistance was "C".

COMPARATIVE EXAMPLE 10

As the same manner, 17.0 parts of XDi, 23.0 parts of PEMP, 23.0 parts of UM (urethanedimethacrylate obtained by reacting 2,6-tolylenediisocyanate with 2-hydroxypropylmethacrylate), 20.0 part of phenylmethacrylate and 0.05 part of tributyl tin dichloride were mixed into a homogeneous solution, followed by degasification. In a dark room, 0.1 part of 2,4,6-trimethylbenzoyldiphenylphosphineoxide and 0.1 part of 2-hydroxybenzophenone were added thereto and the solution was further stirred. The solution was injected into a mold composed of glass mold and gasket and subjected to release treatment. The solution was then irradiated to a light from high pressure mercury lamp for 15 minutes and heated in an oven at 120° C. for 2 hours to cure the solution. After completion of the polymerization, the mold was cooled and the resulting lens was taken out of the mold.

The lens so obtained was colorless and transparent. Optical strain or striae was not observed practically. The lens had a refractive index ($n_d$) of 1.587 and an Abbe number ($v_d$) of 40. When the lens was dyed in a dye bath at 90° C., the dyeability was good and no deformation was observed. When the lens was rubbed with steel wool, the lens was slightly scratched and therefore, the evaluation of scratch resistance was "B", in which the lens was broken at 36 g according to the iron ball dropping test. The evaluation of impact resistance was "A".

COMPARATIVE EXAMPLE 11

A lens was made by the same procedure as in Comparative Example 10 except that 20.0 parts of XDi, 30.0 parts of PEMP, 35.0 parts of UM, 15.0 parts of phenylmethacrylate, 0.1 part of 2,4,6-trimethylbenzoyldi phenylphosphineoxide and 0.1 part of 2-hydroxybenzophenone were used.

The lens so obtained was colorless and transparent. Optical strain or striae was not observed practically. The lens had a refractive index ($n_d$) of 1.588 and an Abbe number ($v_d$) of 40. When the lens was dyed in a dye bath at 90° C., the dyeability was good and no deformation was observed. When the lens was rubbed with steel wool, the lens was slightly scratched and therefore, the evaluation of scratch resistance was "B", in which the lens was broken at 36 g according to the iron ball dropping test. The evaluation of impact resistance was "A".

TABLE 3

| Example | Polyisocyanate (wt. part) | | Polythiol (wt. part) | | Reactive unsaturated compound | | Refractive Index ($n_d$) | Abbe number ($v_d$) | Dyeability | Heat resistance | Scratch resistance | Impact resistance |
|---|---|---|---|---|---|---|---|---|---|---|---|---|
| 40 | XDI | 14.0 | FSH | 41.1 | TMPTMA | 20.0 | 1.599 | 38 | A | A | A | A |
|    | IPDI | 24.9 | | | | | | | | | | |
| 41 | XDI | 20.2 | FSH | 35.2 | TMPTMA | 40.0 | 1.594 | 39 | A | A | A | A |
|    | IPDI | 4.6 | | | | | | | | | | |
| 42 | XDI | 28.4 | FSH | 41.6 | TEGDMA | 30.0 | 1.617 | 37 | A | A | A | A |
| 43 | XDI | 12.3 | FSH | 36.0 | BisME4PP | 30.0 | 1.599 | 38 | A | A | A | A |

TABLE 3-continued

| Example | Polyisocyanate (wt. part) | | Polythiol (wt. part) | | Reactive unsaturated compound | | Refractive Index ($n_d$) | Abbe number ($v_d$) | Dyeability | Heat resistance | Scratch resistance | Impact resistance |
|---|---|---|---|---|---|---|---|---|---|---|---|---|
|  | IPDI | 21.8 |  |  |  |  |  |  |  |  |  |  |
| 44 | XDI | 12.3 | FSH | 36.0 | BisAE2PP | 30.0 | 1.601 | 38 | A | A | A | A |
|  | IPDI | 21.8 |  |  |  |  |  |  |  |  |  |  |
| 45 | XDI | 28.4 | FSH | 41.6 | GDMA | 30.0 | 1.621 | 36 | A | A | A | A |
| 46 | XDI | 28.4 | FSH | 41.6 | DPHA | 30.0 | 1.619 | 37 | A | A | A | A |
| 47 | XDI | 28.4 | FSH | 41.6 | DPMAPA | 30.0 | 1.617 | 38 | A | A | A | A |
| 48 | XDI | 28.4 | FSH | 41.6 | DCPDA | 30.0 | 1.622 | 36 | A | A | A | A |
| 49 | XDI | 28.9 | FSH | 21.1 | TMPTMA | 30.0 | 1.614 | 38 | A | A | A | A |
|  |  |  | GST | 20.0 |  |  |  |  |  |  |  |  |
| 50 | XDI | 25.9 | FSH | 18.9 | TMPTMA | 30.0 | 1.592 | 40 | A | A | A | A |
|  |  |  | PEMP | 25.2 |  |  |  |  |  |  |  |  |
| 51 | XDI | 28.4 | FSH | 41.6 | TMPTMA | 15.0 | 1.627 | 36 | A | A | A | A |
|  |  |  |  |  | BisAE2PP | 15.0 |  |  |  |  |  |  |
| 52 | XDI | 36.9 | FSH | 43.1 | EGDMA | 20.0 | 1.630 | 36 | A | A | A | A |
| 53 | TMXDI | 28.4 | FSH | 41.6 | TMPTMA | 30.0 | 1.584 | 41 | A | A | A | A |
| 54 | NBDI | 28.4 | FSH | 41.6 | TMPTMA | 30.0 | 1.585 | 41 | A | A | A | A |

TEGDMA: Triethyleneglycol dimethacrylate
BisME4PP: 2,2-Bis[4-(methacryloxyethoxyethoxy)-phenyl] propane
BisAE2PP: 2,2-Bis[4-(acryloxyethoxyethoxy)phenyl]-propane
GDMA: Glycerin dimethacrylate
DPHA: Dipentaerythritol hexaacrylate
DPMAPA: Dipentaerythritol monoalkylpentaacrylate
DCPDA: Dicyclopentanyldiacrylate
TMXDI: $\alpha,\alpha,\alpha',\alpha'$-Tetramethylxylylenediisocyanate
NBDI: Bis(isocyanatomethyl)norbornene

EXAMPLE 55

To a mixture of 40.0 parts of FSH, 28.7 parts of XDi and 60.0 parts of trimethylolpropanetriacrylate (TMPTA), 0.15 part of EMPO and 0.1 part of dimethyl tin dichloride as catalysts and 0.1 part of Zelec UN™ as a releasing agent were added. The mixture was stirred at room temperature and then degasified. The resulting mixture was charged into a mold and UV light irradiated thereto for 3 minutes. After cooling and releasing the molded material, the material was heated at 130° C. for 2 hours to cure the lens.

The results of thus obtained lens are shown in Table 4.

EXAMPLE 56

To a mixture of 40.0 parts of FSH, 20.1 parts of XDi and 60.0 parts of trimethylolpropanetriacrylate (TMPTA), 0.15 part of EMPO and 0.1 part of dimethyl tin dichloride as catalysts and 0.1 part of Zelec UN™ as a releasing agent were added. The mixture was stirred at room temperature and then degasified. The resulting mixture was charged into a mold and UV light irradiated thereto for 3 minutes. After cooling and releasing the molded material, the material was heated at 130° C. for 2 hours to cure the lens.

The results of thus obtained lens are shown in Table 4.

EXAMPLE 57

To a mixture of 40.0 parts of FSH, 28.7 parts of XDi, 60.0 parts of pentaerythritoltriacrylate (PETTA) and 20.0 parts of DVB, 0.15 part of EMPO and 0.1 part of dimethyl tin dichloride as catalysts and 0.1 part of Zelec UN™ as a releasing agent were added. The mixture was stirred at room temperature and then degasified. The resulting mixture was charged into a mold and UV light irradiated thereto for 3 minutes. After cooling and releasing the molded material, the material was heated at 130° C. for 2 hours to cure the lens.

The results of thus obtained lens are shown in Table 4.

EXAMPLE 58

To a mixture of 40.0 parts of FSH, 20.1 parts of XDi and 60.0 parts of pentaerythritoltriacrylate (PETTA) and 20.0 parts of DVB, 0.15 part of EMPO and 0.1 part of dimethyl tin dichloride as catalysts and 0.1 part of Zelec UN™ as a releasing agent were added. The mixture was stirred at room temperature and then degasified. The resulting mixture was charged into a mold and UV light irradiated thereto for 3 minutes. After cooling and releasing the molded material, the material was heated at 130° C. for 2 hours to cure the lens.

The results of thus obtained lens are shown in Table 4.

EXAMPLE 59

To a mixture of 20.0 parts of FSH, 40.5 parts of XDi, 50.0 parts of GMA and 20.0 parts of DVB, 0.15 part of EMPO and 0.1 part of dimethyl tin dichloride as catalysts and 0.1 part of Zelec UN™ as a releasing agent were added. The mixture was stirred at room temperature and then degasified. The resulting mixture was charged into a mold and UV light irradiated thereto for 10 minutes. After cooling and releasing the molded material, the material was heated at 130° C. for 2 hours to cure the lens.

The results of thus obtained lens are shown in Table 4.

EXAMPLE 60

To a mixture of 40.0 parts of FSH, 40.5 parts of XDi, 61.2 parts of ethyleneglycoldimethacrylate (EGDMA) and 40.0 parts of DVB, 0.15 part of EMPO and 0.1 part of dimethyl tin dichloride as catalysts and 0.1 part of Zelec UN™ as a releasing agent were added. The mixture was stirred at room temperature and then degasified. The resulting mixture was charged into a mold and UV light irradiated thereto for 3 minutes. After cooling and releasing the molded material, the material was heated at 130° C. for 2 hours to cure the lens.

The results of thus obtained lens are shown in Table 4.

TABLE 4

| Example | Polyisocyanate (wt. part) | | Polythiol (wt. part) | | Reactive unsaturated compound | | Refractive Index ($n_d$) | Abbe number ($v_d$) | Dyeability | Heat resistance | Scratch resistance | Impact resistance |
|---|---|---|---|---|---|---|---|---|---|---|---|---|
| 55 | XDI | 28.7 | FSH | 40.0 | TMPTMA | 60.0 | 1.5936 | 39.5 | A | A | A | A |
| 56 | XDI | 20.1 | FSH | 40.0 | TMPTA | 60.0 | 1.5944 | 38.5 | A | A | A | A |
| 57 | XDI | 28.7 | FSH | 40.0 | PETTA DVB | 60.0 20.0 | 1.6078 | 37.6 | A | A | A | A |
| 58 | XDI | 20.1 | FSH | 40.0 | PETTA DVB | 60.0 20.0 | 1.5959 | 40.1 | A | A | A | A |
| 59 | XDI | 40.5 | FSH | 20.0 | GMA DVB | 50.0 20.0 | 1.5920 | 38.6 | A | A | A | A |
| 60 | XDI | 40.5 | FSH | 40.0 | EGDMA DVB | 61.2 40.0 | 1.590 | 38.8 | A | A | A | A |

EXAMPLE 61

Mixed into a homogeneous solution were 42.6 parts of FSH, 57.4 parts of pentaerythritol tetraacrylate (PETA) and 0.05 part of EMPO, followed by degasification. The solution was injected into a mold composed of glass mold and gasket and subjected to release treatment. The solution was then irradiated with a light from high pressure mercury lamp for 10 seconds to cure a lens. After cooling and releasing the lens, the lens was heated at 120° C. for 2 hours in an oven.

The plastic lens so obtained was colorless and transparent. Optical strain or striae was not observed practically. The lens had a refractive index ($n_d$) of 1.593 and an Abbe's number ($v_d$) of 44.

When the lens was dyed in a dye bath at 90° C., the dyeability was good and no deformation was observed. The evaluation of scratch resistance was "A" and the evaluation of impact resistance was also "A". The results are shown in Table 5.

EXAMPLE 62

Mixed into a homogeneous solution were 48.1 parts of FSH, 51.9 parts of trimethylolpropane triacrylate (TMPTA) and 0.05 part of EMPO, followed by degasification. The solution was injected into a mold composed of glass mold and gasket and subjected to release treatment. The solution was then irradiated with a light from high pressure mercury lamp for 10 seconds to cure a lens. After cooling and releasing the lens, the lens was further heated at 120° C. for 2 hours in an oven.

The plastic lens so obtained was colorless and transparent. Optical strain or striae was not observed practically. The lens had a refractive index ($n_d$) of 1.590 and an Abbe number ($v_d$) of 43.

When the lens was dyed in a dye bath at 90° C., the dyeability was good and no deformation was observed. The evaluation of scratch resistance was "A" and the evaluation of impact resistance was also "A". The results are shown in Table 5.

EXAMPLE 63

Mixed into a homogeneous solution were 42.5 parts of FSH, 28.8 parts of pentaerythritol tetraacrylate (PETA), 28.7 parts of 3,9-divinylspirobi-m-dioxane (DAPE), 0.05 part of EMPO and 0.01 part of Perbutyl O™, followed by enough degasification. The solution was injected into a mold composed of glass mold and gasket and subjected to release treatment. The solution was then irradiated with a light from high pressure mercury lamp for 180 seconds to cure a lens. After cooling and releasing the lens, the lens was further heated at 120° C. for 2 hours in an oven.

The plastic lens so obtained was colorless and transparent. Optical strain or striae was not observed practically. The lens had a refractive index ($n_d$) of 1.592 and an Abbe number ($v_d$) of 44.

When the lens was dyed in a dye bath at 90° C., the dyeability was good and no deformation was observed. The evaluation of scratch resistance was "A" and the evaluation of impact resistance was also "A". The results are shown in Table 5.

EXAMPLE 64

Mixed into a homogeneous solution were 42.5 parts of FSH, 28.8 parts of pentaerythritol tetraacrylate (PETA), 28.7 parts of urethane diallylate obtained by reacting XDi with allylalcohol (XDUA), 0.05 part of EMPO and 0.1 part of Perbutyl O™, followed by degasification. The solution was injected into a mold composed of glass mold and gasket and subjected to release treatment. The solution was then irradiated with a light from high pressure mercury lamp for 180 seconds to cure a lens. After cooling and releasing the lens, the lens was further heated at 120° C. for 2 hours in an oven.

The plastic lens so obtained was colorless and transparent. Optical strain or striae was not observed practically. The lens had a refractive index ($n_d$) of 1.613 and an Abbe number ($v_d$) of 40.

When the lens was dyed in a dye bath at 90° C., the dyeability was good and no deformation was observed. The evaluation of scratch resistance was "A" and the evaluation of impact resistance was also "A". The results are shown in Table 5.

EXAMPLE 65

Mixed into a homogeneous solution were 35.0 parts of FSH, 65.0 parts of urethane diallylate obtained by reacting XDi with allylalcohol (XDUA), 0.05 part of EMPO and 0.1 part of Perbutyl O™, followed by degasification. The solution was injected into a mold composed of glass mold and gasket and subjected to release treatment. The solution was then irradiated with a light from high pressure mercury lamp for 180 seconds to cure a lens. After cooling and releasing the lens, the lens was further heated at 120° C. for 2 hours in an oven.

The plastic lens so obtained was colorless and transparent. Optical strain or striae was not observed practically. The lens had a refractive index ($n_d$) of 1.620 and an Abbe number ($v_d$) of 36.

When the lens was dyed in a dye bath at 90° C., the dyeability was good and no deformation was observed. The evaluation of scratch resistance was "A" and the evaluation of impact resistance was also "A". The results are shown in Table 5.

TABLE 5

| Example | Polythiol (wt. part) | Reactive unsaturated compound (wt. part) | $n_d$ | $v_d$ | 1) | 2) | 3) | 4) |
|---|---|---|---|---|---|---|---|---|
| 61 | FSH/42.6 | PETA/57.4 | 1.593 | 44 | A | A | A | A |
| 62 | FSH/48.1 | TMPTA/51.9 | 1.590 | 43 | A | A | A | A |
| 63 | FSH/42.5 | PETA/28.8 DAPE/28.7 | 1.592 | 44 | A | A | A | A |
| 64 | FSH/42.5 | PETA/28.8 XDUA/28.7 | 1.613 | 40 | A | A | A | A |
| 65 | FSH/35.0 | XDUA/65.0 | 1.620 | 36 | A | A | A | A |

1) Dyeability
2) Heat resistance
3) Scratch resistance
4) Impact resistance

What is claimed is:

1. A composition for forming polysulfide resin which comprises a polythiol having 4 or more of functional groups represented by any of formulae (1) to (3):

Formula (1) being:

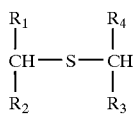

wherein each of $R_1$, $R_2$, $R_3$ and $R_4$ is selected from H, —$CH_2SH$, —$CH_2SCH_2CH_2SH$,

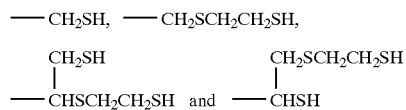

but when any one of $R_1$, $R_2$, $R_3$ and $R_4$ is H, any one of the others is

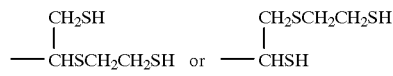

and when any two of $R_1$, $R_2$, $R_3$ and $R_4$ are H, the other two groups are selected from

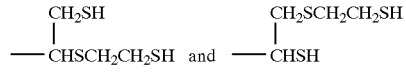

and 3 or more of $R_1$, $R_2$, $R_3$ and $R_4$ are not H,

Formula (2) being:

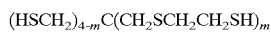

wherein m is an integer of 1 to 3, and

Formula (3) being:

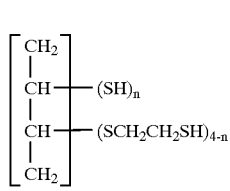

wherein n is an integer of 0 to 3, and a compound having a reactive unsaturated bond(s) and/or b epoxy group(s) and/or c iso(thio)cyanato group (s) in one molecule, with the proviso that the sum of a, b and c is not less than 2 and a and b are not simultaneously 0.

2. The composition according to claim 1 wherein the compound having a reactive unsaturated bond(s) and/or b epoxy group(s) and/or c iso(thio)cyanato group(s) in one molecule is a compound having two or more of the reactive unsaturated bond(s) and/or the epoxy group(s) in all in one molecule.

3. The composition according to claim 1 wherein the compound having a reactive unsaturated bond(s) and/or b epoxy group(s) and/or c iso(thio)cyanato group(s) in one molecule is a compound having one or more reactive unsaturated bond(s) or epoxy group(s) and one or more iso(thio)cyanato group(s) in one molecule.

4. The composition according to claim 1 wherein the compound having a reactive unsaturated bond(s) and/or b epoxy group(s) and/or c iso(thio)cyanato group(s) in one molecule is a compound having two or more reactive unsaturated bonds.

5. The composition according to claim 4 which contains the compound having two or more reactive unsaturated bonds as well as a polyiso(thio)cyanate compound.

6. The composition according to claim 5 which contains any of the polythiols (1), (2) and (3) having 4 or more functional groups as well as a thiol compound having another thiol group or a hydroxyl group.

7. The composition according to claim 1 wherein the compound having a reactive unsaturated bond (s) and/or b epoxy group(s) and/or c iso(thio)cyanato group(s) in one molecule is one or two of compounds represented by formulae (4) to (8):

Formula (4) being:

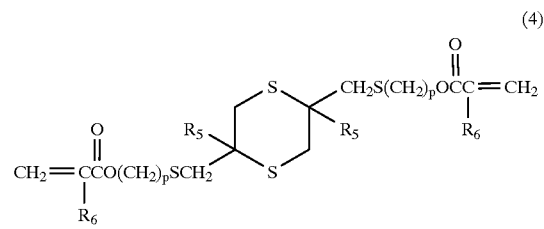

wherein p is an integer of 1 to 4; $R_5$ is a hydrogen atom or a methyl group; and $R_6$ is a hydrogen atom or a methyl group, Formula (5) being:

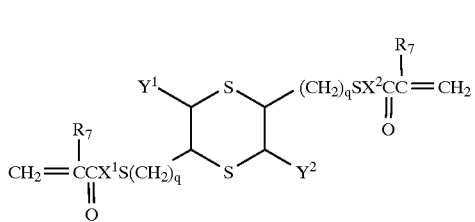

wherein $X^1$ is $-(SCH_2CH_2)_a-$; $X^2$ is $-(CH_2CH_2S)_a-$; a is an integer of 0 to 2; and each of $Y^1$ and $Y^2$ is independently a hydrogen atom or

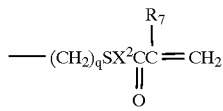

q is an integer of 0 to 5; and $R_7$ is a hydrogen atom or a methyl group,

Formula (6) being:

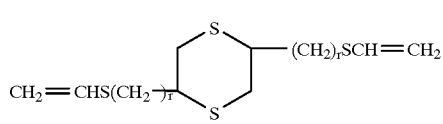

wherein r is an integer of 0 to 3,

Formula (7) being:

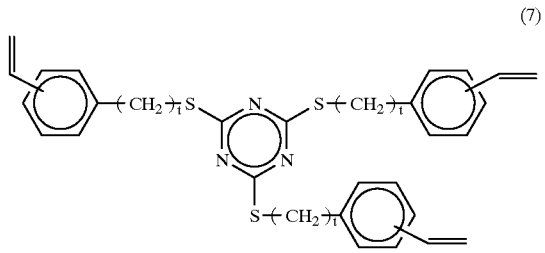

wherein t is an integer of 1 to 5,

Formula (8) being:

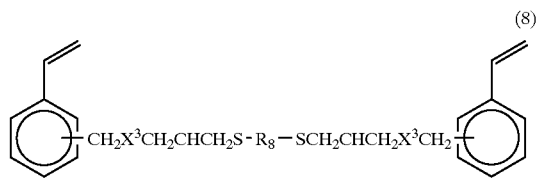

wherein $X^3$ is an oxygen atom or a sulfur atom; and $R_8$ is an alkyl group of $C_1$ to $C_6$, $-CH_2SCH_2-$, $-CH_2CH_2SCH_2CH_2-$, $-CH_2CH_2CH_2SCH_2CH_2CH_2-$,

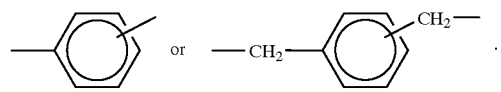

8. The composition according to claim 1 wherein a functional group molar ratio of (the reactive unsaturated bond+the epoxy group+the iso(thio)cyanato group)/(the mercapto group) is in the range of 0.5 to 20.0.

9. The composition according to claim 6 wherein a functional group molar ratio of (the reactive unsaturated bond+the iso(thio)cyanato group)/(the mercapto group+the hydroxyl group) is in the range of 1.0 to 3.0.

10. The composition according to claim 2 wherein a functional group molar ratio of (the reactive unsaturated bond+the epoxy group)/(the mercapto group) is in the range of 0.5 to 10.0.

11. A polysulfide resin which is obtained by curing a composition in any one of claims 1 to 10.

12. An optical material which comprises the polysulfide resin in claim 11.

13. A lens which comprises the optical material in claim 12.

14. A process for preparing a polysulfide resin which comprises the step of applying heat and/or ultraviolet light and/or visible light to a composition in any one of claims 1 to 10 to cure the composition.

15. A process for preparing a polysulfide resin which comprises the step of cast polymerizing a composition in any one of claims 1 to 10.

* * * * *